US010983055B2

United States Patent
Suzuki et al.

(10) Patent No.: US 10,983,055 B2
(45) Date of Patent: Apr. 20, 2021

(54) SAMPLE OBSERVATION APPARATUS

(71) Applicant: OLYMPUS CORPORATION, Tokyo (JP)

(72) Inventors: Yoshimasa Suzuki, Kawasaki (JP); Mayumi Odaira, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 39 days.

(21) Appl. No.: 16/409,985

(22) Filed: May 13, 2019

(65) Prior Publication Data
US 2019/0271644 A1    Sep. 5, 2019

Related U.S. Application Data

(63) Continuation of application No. PCT/JP2016/084153, filed on Nov. 17, 2016.

(51) Int. Cl.
*G01N 21/64* (2006.01)
*G02B 21/00* (2006.01)
*G01N 21/17* (2006.01)

(52) U.S. Cl.
CPC .......... *G01N 21/64* (2013.01); *G01N 21/17* (2013.01); *G02B 21/00* (2013.01); *G02B 21/0032* (2013.01); *G02B 21/0076* (2013.01)

(58) Field of Classification Search
CPC ......... G01N 21/64; G01N 21/17; G02B 21/00
See application file for complete search history.

(56) References Cited

U.S. PATENT DOCUMENTS 8,094,371 B2    1/2012  Nishiwaki
10,133,050 B2   11/2018 Suzuki et al.
2009/0086314 A1* 4/2009 Namba .................. G02B 21/34
                                                 359/383

(Continued)

FOREIGN PATENT DOCUMENTS

JP          2010-054601 A    3/2010
WO     WO 2014/178294 A1    11/2014
WO     WO 2015/098242 A1     7/2015

OTHER PUBLICATIONS

International Search Report dated Feb. 21, 2017 issued in PCT/JP2016/084153.
(Continued)

*Primary Examiner* — Hugh Maupin
(74) *Attorney, Agent, or Firm* — Scully, Scott, Murphy & Presser, P.C.

(57) ABSTRACT

A sample observation apparatus includes a light source unit, an illumination optical system, a detection optical system, a light detection element, and an image processing apparatus. The scanning unit relatively moves the light spot and the sample. An optical member is disposed. The illumination optical system and the detection optical system are disposed such that an image of a pupil of the illumination optical system is formed at a pupil position of the detection optical system. The image of the pupil of the illumination optical system is decentered relative to a pupil of the detection optical system due to refraction caused by the sample. The illumination optical system, the detection optical system, and the optical member are configured such that quantity of light passing through the pupil of the detection optical system changes by decentering.

14 Claims, 22 Drawing Sheets

(56) References Cited

U.S. PATENT DOCUMENTS

| | | |
|---|---|---|
| 2010/0053740 A1 | 3/2010 | Nishiwaki |
| 2014/0362435 A1* | 12/2014 | Yokoi ................ G02B 21/0032 359/385 |
| 2014/0376078 A1* | 12/2014 | Shimada ............ G02B 21/0036 359/285 |
| 2016/0306155 A1 | 10/2016 | Suzuki |

OTHER PUBLICATIONS

International Preliminary Report on Patentability dated May 31, 2019, together with the Written Opinion received in related International Application No. PCT/JP2016/084153.

* cited by examiner

SAMPLE OBSERVATION APPARATUS

CROSS-REFERENCE TO RELATED APPLICATION

The present application is a continuation application of International Application No. PCT/JP2016/084153 filed on Nov. 17, 2016, the entire contents of which are incorporated herein by reference.

BACKGROUND OF THE INVENTION

Field of the Invention

The present invention relates to an apparatus capable of observation and acquisition of an image of a colorless and transparent sample.

Description of the Related Art

As an apparatus capable of performing observation and acquisition of an image of a colorless and transparent sample, an apparatus disclosed in Japanese Patent Application Laid-open No. 2010-54601 is available.

The apparatus disclosed in Japanese Patent Application Laid-open No. 2010-54601 includes a phase contrast objectives, a laser light source, a scanning unit, a first detector, a second detector, and a ring slit. The first detector detects radiated light from a sample surface. The second detector detects emitted light from the sample surface.

In the apparatus disclosed in Japanese Patent Application Laid-open No. 2010-54601, the phase contrast objectives and the ring slit are disposed in the optical path. For this reason, an optical image detected with the second detector is a phase contrast image. When the sample is stained with fluorescent dye, fluorescence is emitted from the sample. Accordingly, an optical image detected with the first detector is a fluorescent image.

SUMMARY OF THE INVENTION

A sample observation apparatus according to the present invention comprises:

a light source unit; an illumination optical system; a detection optical system; a light detection element; and an image processing apparatus, wherein the illumination optical system and the detection optical system are disposed to face each other with a sample interposed therebetween, light emitted from the light source unit is incident on the illumination optical system, a light spot is formed between the illumination optical system and the detection optical system by the illumination optical system, a scanning unit is disposed in an optical path from the light source unit to the light detection element, the scanning unit relatively moves the light spot and the sample, an optical member is disposed in at least one of the illumination optical system and the detection optical system, the illumination optical system and the detection optical system are disposed such that an image of a pupil of the illumination optical system is formed at a pupil position of the detection optical system, the image of the pupil of the illumination optical system is decentered relative to a pupil of the detection optical system due to refraction caused by the sample, the illumination optical system, the detection optical system, and the optical member are configured such that quantity of light passing through the pupil of the detection optical system changes by decentering, and the image processing apparatus generates an image of the sample from a detection result of the light detection element.

DETAILED DESCRIPTION OF THE INVENTION

Embodiments and examples of a sample observation apparatus will be described below in detail by referring to the accompanying diagrams. However, the present invention is not restricted to the embodiments and the examples described below.

A sample observation apparatus of the present embodiment comprises: a light source unit; an illumination optical system; a detection optical system; a light detection element; and an image processing apparatus, wherein the illumination optical system and the detection optical system are disposed to face each other with a sample interposed therebetween, light emitted from the light source unit is incident on the illumination optical system, a light spot is formed between the illumination optical system and the detection optical system by the illumination optical system, a scanning unit is disposed in an optical path from the light source unit to the light detection element, the scanning unit relatively moves the light spot and the sample, an optical member is disposed in at least one of the illumination optical system and the detection optical system, the illumination optical system and the detection optical system are disposed such that an image of a pupil of the illumination optical system is formed at a pupil position of the detection optical system, the image of the pupil of the illumination optical system is decentered relative to a pupil of the detection optical system due to refraction caused by the sample, the illumination optical system, the detection optical system, and the optical member are configured such that quantity of light passing through the pupil of the detection optical system changes by decentering, and the image processing apparatus generates an image of the sample from a detection result of the light detection element.

Figure 1:
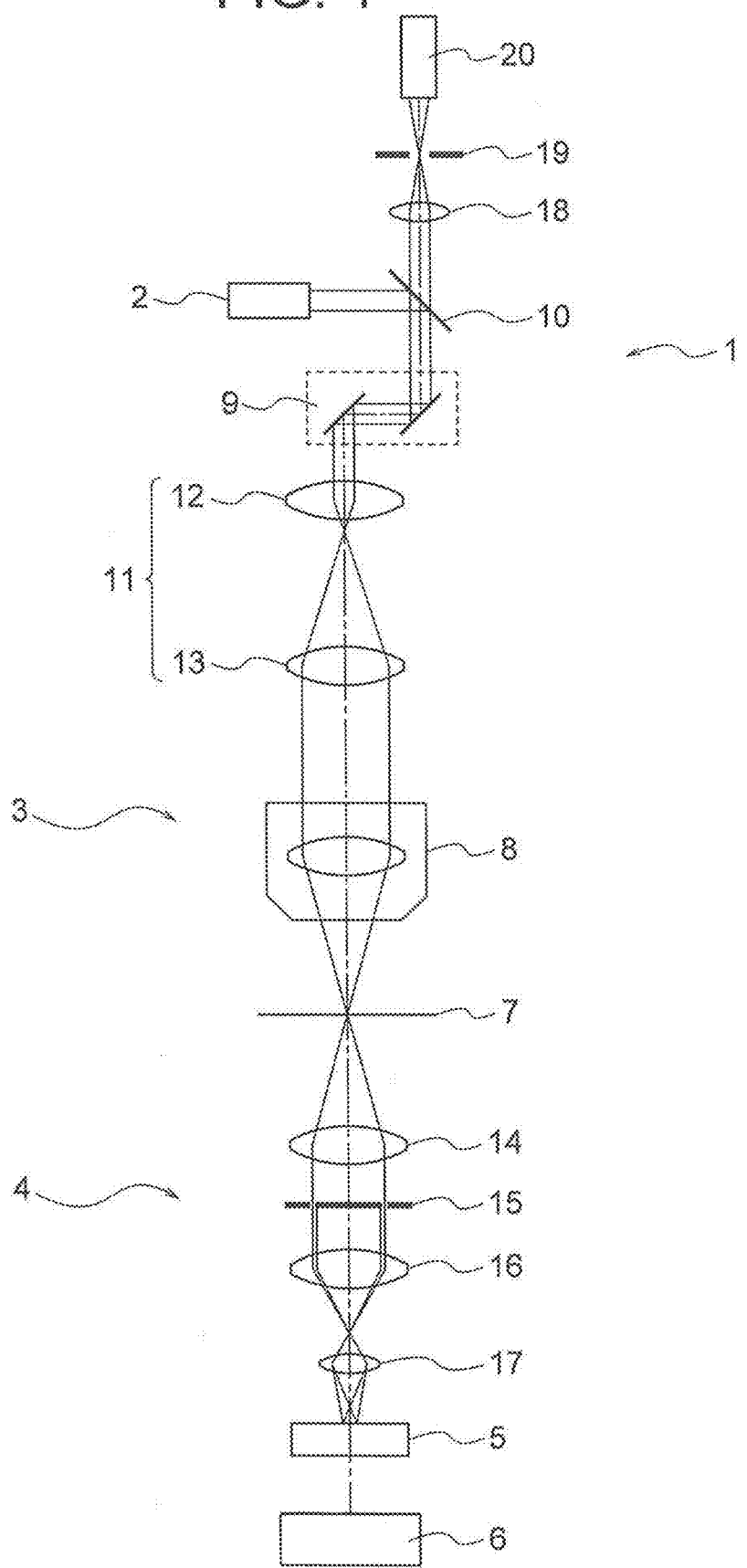
FIG. 1 is a diagram showing a sample observation apparatus of the present embodiment.

FIG. 1 is a diagram showing a sample observation apparatus of the present embodiment. A sample observation apparatus 1 includes a light source unit 2, an illumination optical system 3, a detection optical system 4, a light detection element 5, and an image processing apparatus 6. In the sample observation apparatus 1, the illumination optical system 3 and the detection optical system 4 are disposed to face each other with a sample 7 interposed therebetween.

The light source unit 2 includes a point light source or a surface light source. As the point light source, for example, a laser is available. As the surface light source, for example, an LED, a mercury lamp, or a xenon lamp is available.

The surface light source is used together with a small aperture. As the small aperture, for example, a pinhole is available. With a combination of the surface light source and the small aperture, light substantially equal to the light emitted from the point light source is emitted from the light source unit 2.

The light emitted from the light source unit 2 (hereinafter referred to as "illumination light") is incident on a light-ray separating unit 10. At the light-ray separating unit 10, incident illumination light emerges upon being split into transmitted light and reflected light. As a method of splitting into two lights, splitting according to the light intensity, splitting according to a difference of a direction of polarization, and splitting according to a difference of wavelength are available.

The illumination light reflected with the light-ray separating unit 10 is incident on the illumination optical system 3. By the illumination optical system 3, a light spot is formed between the illumination optical system 3 and the detection optical system 4. The sample 7 is disposed between the illumination optical system 3 and the detection optical system 4. By making an arrangement such that the position of the sample 7 coincides with the position of the light spot, it is possible to illuminate the sample 7 with the light spot.

To form the light spot, the illumination light may be light emitted from the point light source. As described above, the light emitted from the light source unit 2 is light emitted from the point light source. Accordingly, in the sample observation apparatus 1, a light spot is formed.

In the sample observation apparatus 1, a microscope optical system is used. Accordingly, in the sample observation apparatus 1, a microscope objective lens 8 (hereinafter referred to as "objective lens 8") is used as the illumination optical system 3.

As described above, the sample 7 is illuminated with the light spot. In this case, only one point on the sample 7 is illuminated. To illuminate the whole sample 7, it is necessary to relatively move the light spot and the sample 7. It is possible to relatively move the light spot and the sample 7 by disposing a scanning unit in an optical path from the light source unit 2 to the light detection element 5.

In the sample observation apparatus 1, as the scanning unit, an optical scanning unit 9 is disposed in an optical path between the light source unit 2 and the illumination optical system 3. The optical scanning unit 9 includes two optical deflection elements. As the light detection element, a galvanometer scanner, a polygon scanner, or an acousto-optical deflection element is available.

In the optical scanning unit 9, light incident on the optical scanning unit 9 is deflected in two orthogonal directions, for example, in an X direction and a Y direction. As described above, a scanning pattern is generated in the optical scanning unit 9.

A pupil projection optical system 11 is disposed between the optical scanning unit 9 and the objective lens 8. The pupil projection optical system 11 includes a lens 12 and a lens 13. By the pupil projection optical system 11, the optical scanning unit 9 and a pupil of the objective lens 8 are conjugate.

When the two optical deflection elements are close to each other, any position between a deflection surface of one deflection element and a deflection surface of the other deflection element is conjugate with the pupil position of the objective lens 8. When a lens is disposed between the two deflection elements, both the deflection surface of one deflection element and the deflection surface of the other deflection element are conjugate with the pupil of the objective lens 8.

The scanning pattern generated in the optical scanning unit 9 is projected onto the pupil of the objective lens 8. On the basis of the scanning pattern, the light spot moves on the sample 7. In this state, only the light spot moves, and the sample 7 does not move.

As described above, in the sample observation apparatus 1, the light spot and the sample 7 relatively move in a plane orthogonal to the optical axis. As a result, it is possible to scan the sample with the light spot discretely or continuously.

The light transmitted through the sample 7 (hereinafter referred to as "imaging light") is incident on the detection optical system 4. As described above, in the sample observation apparatus of the present embodiment, an optical member may be disposed in at least one of the illumination optical system and the detection optical system. In the sample observation apparatus 1, an optical member 15 is disposed in the detection optical system 4.

The detection optical system 4 includes a pupil projection lens 14, the optical member 15, a lens 16, and a lens 17. As the pupil projection lens 14, for example, it is possible to use a condenser lens of a microscope.

The imaging light incident on the detection optical system 4 is transmitted through the pupil projection lens 14 and the optical member 15, and incident on the lens 16. The imaging light incident on the lens 16 is transmitted through the lens 17, and reaches the light-receiving surface of the light detection element 5.

In the sample observation apparatus 1, a pupil position of the pupil projection lens 14 and the position of the light detection element 5 are not conjugate. The pupil position of the pupil projection lens 14 and the position of the light detection element 5 may be made to be conjugate. As described above, the optical scanning unit 9 and the pupil position of the objective lens 8 are conjugate. In addition, the pupil position of the objective lens 8 and the pupil position of the pupil projection lens 14 are conjugate. By making the pupil position of the pupil projection lens 14 and the position of the light detection element 5 to be conjugate, it is possible to make the optical scanning unit 9 and the position of the light detection element 5 to be conjugate.

In the optical scanning unit 9, illumination light is deflected. In the deflection, an angle made between the illumination light and the optical axis is changed. However, in a plane orthogonal to the optical axis, the position of the illumination light is not changed. When the optical scanning unit 9 and the position of the light detection element 5 are made to be conjugate, in the light detection element 5, the incident angle of the imaging light incident on the light-receiving surface is changed, but the incident position in the light-receiving surface thereof is not changed.

In the light detection element 5, photoelectric conversion is performed. The imaging light is converted into an electric signal and, in this manner, an image signal of the sample 7 is generated. The image signal of the sample 7 is input to the image processing apparatus 6. In the image processing apparatus 6, various processing is performed.

In the sample observation apparatus 1, the illumination optical system 3 and the detection optical element 4 are disposed such that the image of the pupil of the illumination optical system 3 is formed at the pupil position of the detection optical system 4. For this reason, the image of the pupil of the objective lens 8 is formed at the pupil position of the pupil projection lens 14. As described above, in the sample observation apparatus 1, the pupil position of the objective lens 8 and the pupil position of the pupil projection lens 14 are conjugate.

Accordingly, in the sample observation apparatus 1, the image of the pupil of the illumination optical system 3 is decentered relative to the pupil of the detection optical system 4 due to refraction caused by the sample 7. In addition, the illumination optical system 3, the detection optical system 4, and the optical member 15 are configured such that the quantity of light passing through the pupil of the detection optical system 4 changes by decentering.

With this method, in the sample observation apparatus of the present embodiment, a change in shape at the sample (change in inclination) is converted into a change in displacement of the image of the pupil of the illumination optical system. Then, the change in displacement of the image of the pupil of the illumination optical system causes a change in the amount of alight flux passing through the pupil of the detection optical system. That is, the change in shape at the sample can be detected as a change in brightness. As a result, even when the sample is colorless and transparent, it is possible to obtain a sample image with shadow.

Further, in the sample observation apparatus of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods (e.g., bright-field observation, fluorescent observation and polarization observation) can be performed easily with one objective lens.

The sample observation apparatus of the present embodiment preferably further includes a second light detection element to detect radiated light from the sample, and detection of fluorescence is preformed by the second light detection element.

When illumination light is applied to the sample 7, reflected light is generated in the sample 7. In addition, when the sample is stained with fluorescent dye, fluorescence is generated from the sample 7. Accordingly, it is possible to form an optical image using these types of light.

Part of the reflected light and/or fluorescence is incident on the illumination optical system 3. The light incident on the illumination optical system 3 passes through the pupil projection optical system 11 and the optical scanning unit 9, and is incident on the light-ray separating unit 10.

The light incident on the light-ray separating unit 10 passes through the light-ray separating unit 10, and is condensed by a confocal lens 18. A confocal pinhole 19 is disposed at a condensing position. Light having passed through the confocal pinhole 19 is detected by a photodetector 20.

The photodetector 20 is the second light detection element. In the photodetector 20, light reflected from the sample 7 and/or fluorescence are detected. For this reason, it is possible to acquire a reflected image of the sample 7 and/or a fluorescent image of the sample 7.

Photoelectric conversion is performed in the photodetector 20. The light having passed through the confocal pinhole 19 is converted into an electric signal and thereby an image signal of the sample 7 is generated. The image signal at this time is a signal of a confocal image.

In the sample observation apparatus of the present embodiment, since the photodetector 20 is provided, it is possible to observe a sample image with shadow and a fluorescent image by one time illumination. In addition, it is possible to simultaneously observe two images by superimposing an image of the sample image with shadow and an image of the fluorescent image. In this case, it is possible to accurately superimpose the two images.

In the sample observation apparatus 1, as the scanning unit, two light deflection elements are used. However, the scanning unit is not limited thereto. Another scanning unit will be described.

Figure 2A:
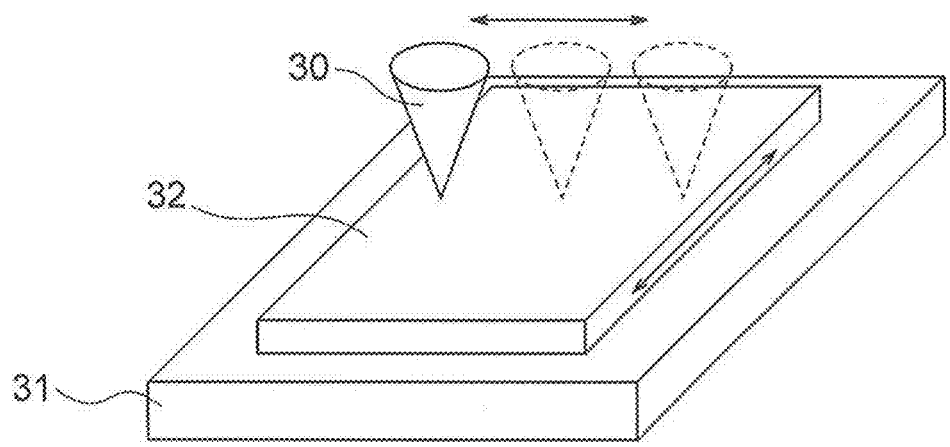
FIG. 2A is a diagram showing a scanning unit of a first example.

A scanning unit of a first example will be described. FIG. 2A is a diagram showing a scanning unit of the first example. In the scanning unit of the first example, scanning in one direction is performed by movement of the light spot, and scanning in the other direction is performed by movement of the stage. Accordingly, in the scanning unit of the first example, both the light spot and the sample move.

In the scanning unit of the first example, an optical scanning unit is disposed in an optical path between the light source unit and the illumination optical system. The optical scanning unit includes one light deflection element. In addition, a movement stage 32 is placed on a holding member 31. The sample is placed on the movement stage 32.

In the scanning unit of the first example, illumination light 30 is moved in the X direction by the light deflection element. In addition, the sample is moved in the Y direction by the movement stage 32. In this manner, it is possible to scan the sample with the light spot discretely or continuously.

Figure 2B:
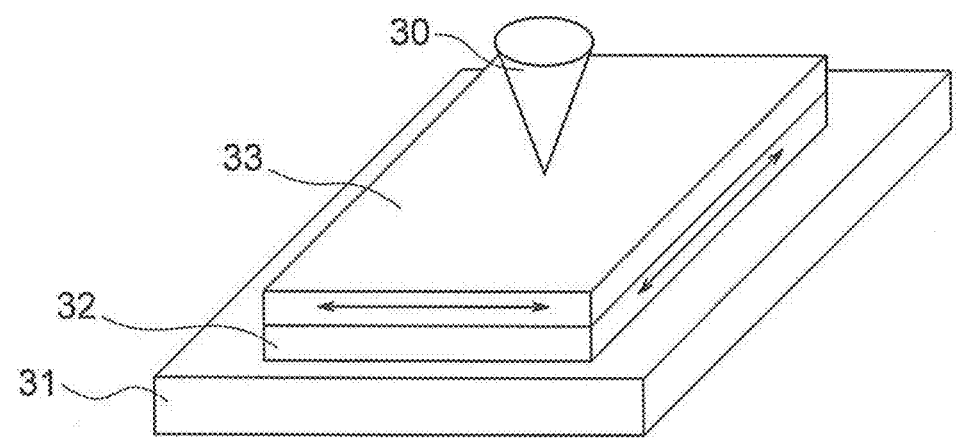
FIG. 2B is a diagram showing a scanning unit of a second example.

A scanning unit of a second example will be described. FIG. 2B is a diagram showing a scanning unit of the second example. In the scanning unit of the second example, both scanning in one direction and scanning in the other direction are performed by movement of the stage. Accordingly, in the scanning unit of the second example, the light spot does not move, but only the sample moves.

In the scanning unit of the second example, the movement stage 32 and a movement stage 33 are placed on the holding member 31. The sample is placed on the movement stage 33. No optical scanning unit is disposed in the optical path between the light source unit and the illumination optical system.

In the scanning unit of the second example, the illumination light 30 does not move. Instead, the sample is moved in the Y direction by the movement stage 32, and the sample is moved in the X direction by the movement stage 33. In this manner, it is possible to scan the sample with the light spot discretely or continuously.

Figure 3:
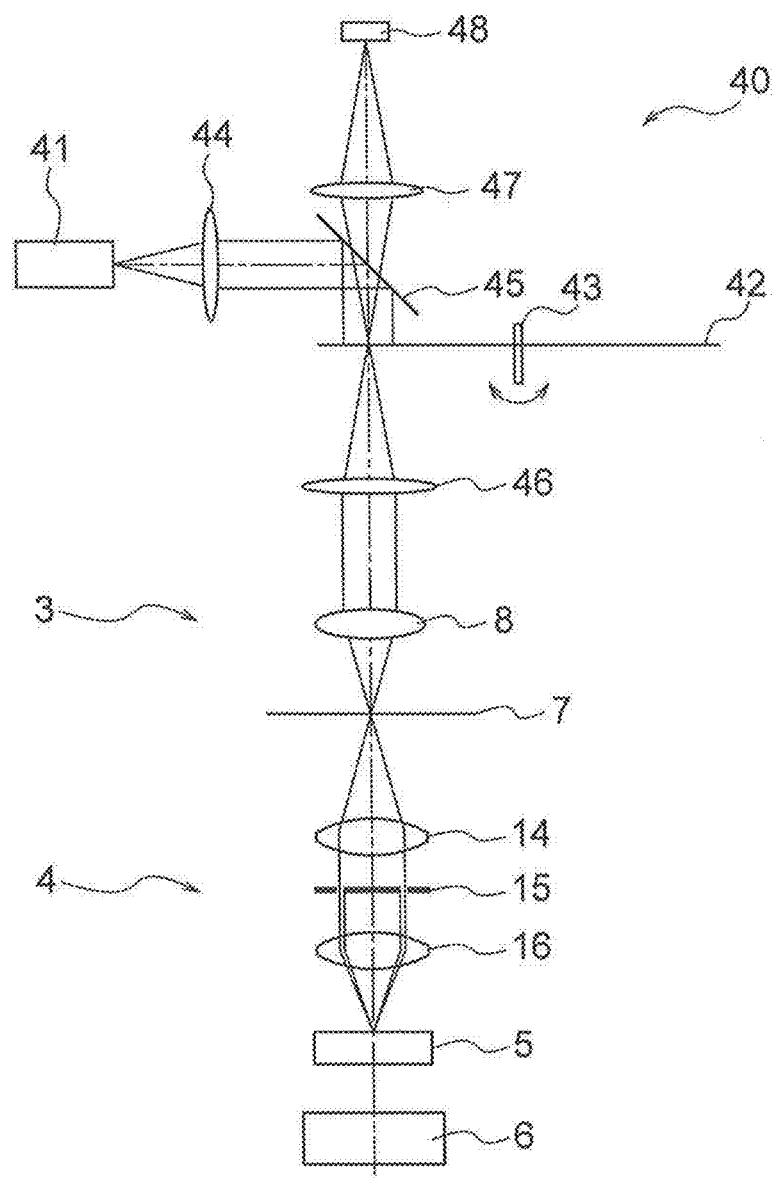
FIG. 3 is a diagram showing the sample observation apparatus including a scanning unit of a third example.

A scanning unit of a third example will be described. FIG. 3 is a diagram showing a sample observation apparatus including the scanning unit of the third example. The same reference numerals are assigned to the same configurations as those in FIG. 1, and their detailed descriptions are omitted.

A sample observation apparatus 40 includes a light source unit 41, the illumination optical system 3, the detection optical system 4, the light detection element 5, and the image processing apparatus 6. The sample observation apparatus 40 includes an aperture plate 42 as the scanning unit of the third example. The aperture plate 42 is disposed in an optical path between the light source unit 41 and the illumination optical system 3.

The light source unit 41 includes a point light source or a surface light source. Light emitted from the light source unit 41 may be light emitted from a point light source or light emitted from a surface light source. In this example, the light emitted from the light source unit 41 is light emitted from a point light source.

The light emitted from the light source unit 41 is converted to substantially parallel light by a collimator lens 44. The light converted to the substantially parallel is reflected by a beam splitter 45, and applied to the aperture plate 42. The aperture plate 42 is rotatable around an axis 43 with a motor (not illustrated).

Figure 4:
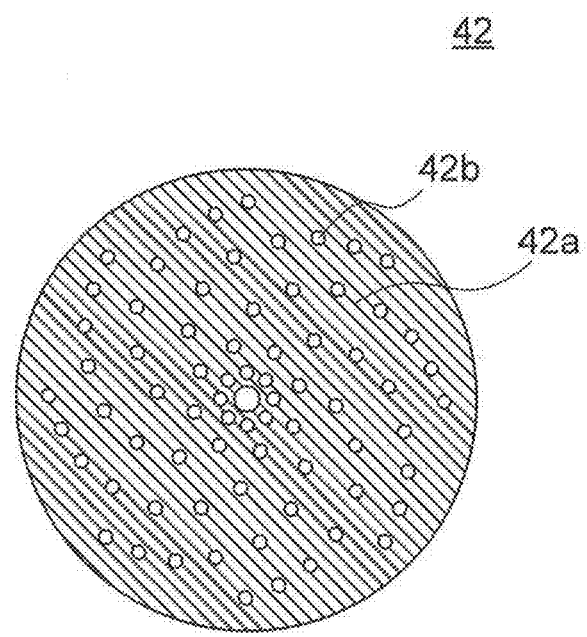
FIG. 4 is a diagram showing a structure of an aperture plate.

FIG. 4 is a diagram illustrating a structure of the aperture plate. The aperture plate 42 is a circular flat plate, and includes a light-shielding part 42a and transmission part 42b. The light-shielding part 42a is formed from an opaque material, such as a metal plate. The transmission parts 42b are aperture (hole) formed in the metal plate.

The aperture plate 42 may be formed from, for example, a glass plate and/or a resin plate. The light-shielding part 42a is formed by applying light-shielding paint on a glass plate, for example. By contrast, no paint is applied to the transmission part 42b. Accordingly, the transmission part 42b is formed from the glass plate itself.

The size of the transmission part 42b is very small. For this reason, light substantially equal to the light emitted from the point light source is emerged from the transmission part 42b. In addition, a plurality of transmission parts 42b are formed. The diameter of light applied to the aperture plate 42 is set to include a plurality of transmission parts 42b. For this reason, light substantially equal to the light emitted from a point light source is emerged from a plurality of positions of the aperture plate 42.

The light emerged from the aperture plate 42 passes through an imaging lens 46, and is incident on the objective lens 8. The light incident on the objective lens 8 is applied to the sample 7. In the sample observation apparatus 40, the position of the aperture plate 42 and the position of the sample 7 are conjugate. For this reason, a plurality of light spots are generated on the sample 7.

As described above, the aperture plate 42 is rotatable around the axis 43. When the aperture plate 42 is rotated, a plurality of light spots formed on the sample 7 move. As a result, it is possible to scan the sample with the light spots continuously.

The light transmitted through the sample 7 is incident on the light-receiving surface of the light detection element 5 through the detection optical system 4. In the sample observation apparatus 40, a plurality of light spots are generated on the sample 7. Accordingly, the position of the light detection element 5 is conjugate with the position of the sample 7.

The light reflected with the sample 7 and/or fluorescence generated in the sample 7 passes through the objective lens 8 and the imaging lens 46, and is incident on the aperture plate 42. These types of light pass through the transmission parts 42b and the beam splitter 45, and are condensed with the lens 47.

A photodetector 48 is disposed at the condensing position. The light condensed with the lens 47 is detected with the photodetector 48. It is possible to regard the transmission part 42b as pinhole. Accordingly, a signal of a confocal image is acquired from the photodetector 48.

The optical member 15 will be described. The optical member 15 is an aperture member which includes a light-shielding part or a darkening part, and a transmission part. A structure of the aperture member will be described.

Figure 5A:
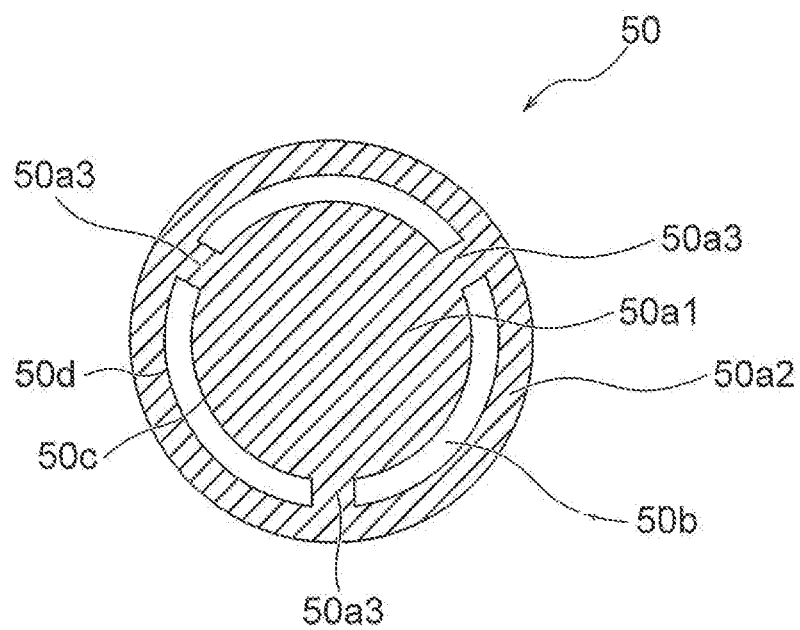
FIG. 5A is a diagram showing an aperture member formed from an opaque member.
Figure 5B:
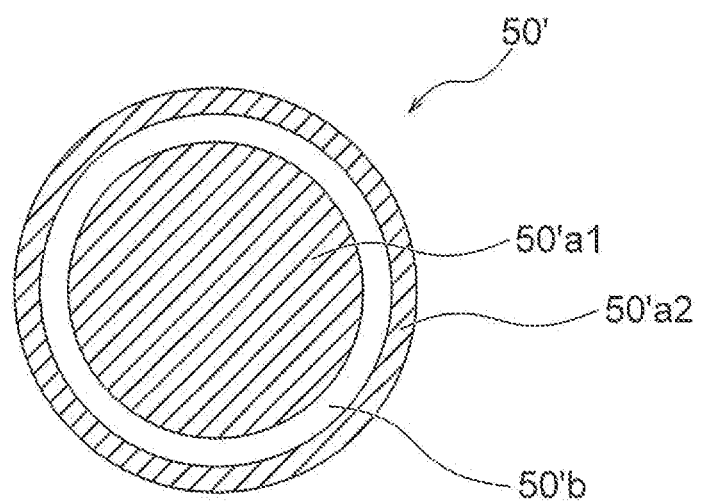
FIG. 5B is a diagram showing an aperture member formed from a transparent member.

The configuration of the aperture member is shown in FIG. 5A and FIG. 5B. FIG. 5A shows the aperture member formed from an opaque member, and FIG. 5B shows the aperture member formed from a transparent member.

As shown in FIG. 5A, the aperture member 50 includes a light-shielding part 50a1 and a transmission part 50b. Further, the aperture member 50 includes a light-shielding part 50a2. The light-shielding parts 50a1 and 50a2 are formed from an opaque member, such as a metal plate. The transmission part 50b is a gap (hole) bored at the metal plate.

At the aperture member 50, three connecting parts 50a3 are formed between the light-shielding part 50a1 and the light-shielding part 50a2 to hold the light-shielding part 50a1. Therefore, the transmission part 50b is divided three parts. The shape of each transmission part 50b is a substantially fan-like shape (discrete ring-band shape). The number of the connecting parts 50a3 is not limited to three.

The aperture member 50 can be disposed in the illumination optical system. In this case, the aperture member 50 is disposed so that the light-shielding part 50a1 includes the optical axis of the illumination optical system. The light-shielding part 50a1 has an outer edge 50c that is at a position away from the optical axis of the illumination optical system by predetermined distance. Therefore, the illumination light incident on the aperture member 50 is shielded at the center of the light flux by the light-shielding part 50a1. Here, the boundary between the light-shielding part 50a1 and the transmission part 50b corresponds to the outer edge 50c of the light-shielding part 50a1.

The light-shielding part 50a2 is located outside (direction moving away from the optical axis) of the light-shielding part 50a1 and the transmission part 50b. Here, the boundary between the transmission part 50b and the light-shielding part 50a2 corresponds to an inner edge 50d of the light-shielding part 50a2.

The transmission part 50b is located outside of the outer edge 50c of the light-shielding part 50a1. Here, the boundary between the light-shielding part 50a1 and the transmission part 50b corresponds to the inner edge of the transmission part 50b. Moreover, the boundary between the transmission part 50b and the light-shielding part 50a2 corresponds to the outer edge of the transmission part 50b. Therefore, 50c represents the outer edge of the light-shielding part 50a1 and the inner edge of the transmission part 50b, and 50d represents the inner edge of the light-shielding part 50a2 and the outer edge of the transmission part 50b.

In the light-shielding parts 50a1 and 50a2 and the connecting parts 50a3, the reflectivity of the surface is suppressed to low. Accordingly, in the light-shielding parts 50a1 and 50a2 and the connecting parts 50a3, reflection of light hardly occurs. When a metal plate is used for the aperture member 50, the light-shielding parts 50a1 and 50a2 and the connecting parts 50a3 are subjected to antireflection treatment, such as black plating.

The imaging light is incident on the optical member 15, for example, the aperture member 50. The aperture member 50 serving as an example will be described below. Part of the imaging light is applied to the light-shielding part 50a1. By the application, reflected light is generated in the light-shielding part 50a1.

Since the imaging light is light having passed through the sample 7, the imaging light has large light intensity. When reflectivity of the light-shielding part 50a1 is large, the light intensity of the reflected light generated in the light-shielding part 50a1 also becomes large. In this case, reflected light with large intensity is returned to the surface of the sample 7. The reflected light becomes a flare.

In addition, in the case of using a light source with high temporal coherence, such as laser light, the illumination light interferes with the reflected light from the light-shielding part 50a1 on the surface of the sample. As a result, interference fringes occur on the surface of the sample 7. For this reason, the image of the sample 7 is influenced by the interference fringes. By reducing the reflectivity in the light-shielding part 50a1, it is possible to reduce the light intensity of the reflected light generated in the light-shielding part 50a1. As a result, it is possible to suppress occurrence of a flare or occurrence of interference fringes.

Moreover, as shown in FIG. 5B, an aperture member 50' includes a light-shielding part 50'a1 and a transmission part 5'0b. Further, the aperture member 50' includes a light-shielding part 50'a2. The light-shielding parts 50'a1 and 50'a2, and the transmission part 50'b are formed from a transparent member, such as a glass plate or a resin plate. The light-shielding parts 50'a1 and 50'a2 are formed by applying light-shielding paint on a glass plate. On the other hand, nothing is applied to the transmission part 50'b. Therefore, the transmission part 50'b is a glass plate as it is.

At the aperture member 50', a shape of the transmission part 50'b is an annulus. This is because there is no need to hold the light-shielding part 50'a2. Therefore, at the aperture member 50', a connecting part does not formed between the light-shielding part 50'a1 and the light-shielding part 50'a2.

A major difference between the aperture member 50' and the aperture member 50 are the material, and the presence or not of the connecting part. Therefore, the detailed descriptions of the light-shielding part 50'a1 and 50'a2, and the transmission part 50'b are omitted.

The light-shielding part 50a2 and the connecting parts 50a3 of the aperture member 50, and the light-shielding part 50'a2 of the aperture member 50' are not always required. For instance, the size (diameter) of a light flux of the illumination light may correspond to the outer edge of the transmission part 50b or the outer edge of the transmission part 50'b.

As described above, the aperture member 50, 50' includes the light-shielding part 50a1, 50'a1 and the transmission part 50b, 50'b. Therefore, an illumination light having a substantially annular shape or an annular shape (hereinafter, referred to as "annular shape" as appropriate) emanates form the aperture member 50, 50'.

In the sample observation apparatus of the present embodiment, it is preferable that the detection optical system include an optical member, the optical member be an aperture member which includes a light-shielding part or a darkening part, and a transmission part, the aperture member be disposed such that the light-shielding part or the darkening part includes the optical axis of the detection optical system, the transmission part be located outside of an outer edge of the light-shielding part or the darkening part, and an image of an outer edge of a pupil of the illumination optical system be formed between an inner edge of the transmission part and an outer edge of the transmission part.

An action generated with the optical member 15 will be described. In the sample observation apparatus of the present embodiment, the optical member is disposed in at least one of the illumination optical system and the detection optical system. Here, a case where the optical member is disposed in the detection optical system will be described. The aperture member 50' shown in FIG. 5B is used as the optical member.

The aperture member 50' includes a light-shielding part 50'a1, a light-shielding part 50'a2, and a transmission part 50'b. The aperture member 50' is disposed such that the light-shielding part 50'a1 includes the optical axis of the detection optical system 4. The transmission part 50'b is located outside of the outer edge of the light-shielding part 50'a1.

Figure 6A:
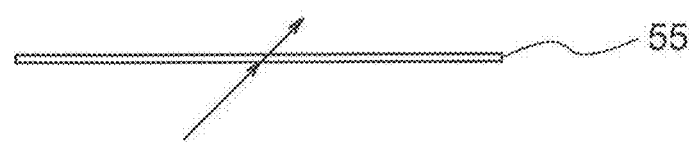
FIG. 6A is a diagram showing a state of refraction of light at a sample position.
Figure 6B:
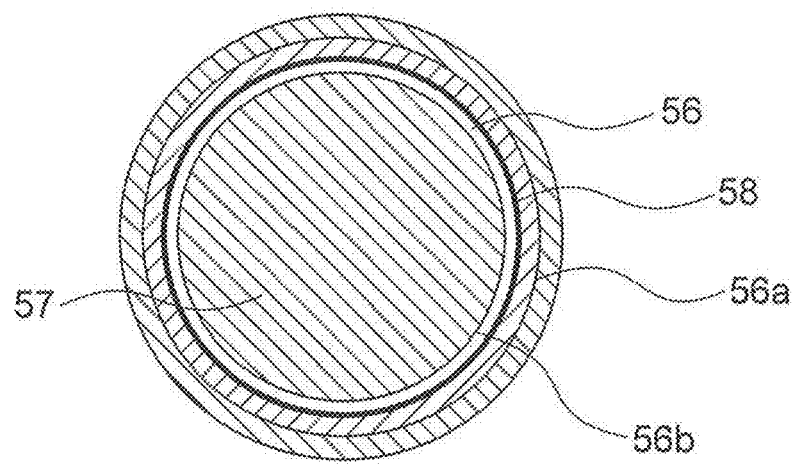
FIG. 6B is a diagram showing relationship between an image of a pupil of an illumination optical system and the aperture member.

FIG. 6A is a diagram showing the state of refraction of light at the sample position, and FIG. 6B is a diagram showing the relationship between an image of the pupil of the illumination optical system and the aperture member. FIG. 6A and FIG. 6B show a case where no sample is present. A case where a sample is present but its surface is flat, is included in the case where no sample is present.

Figure 7A:
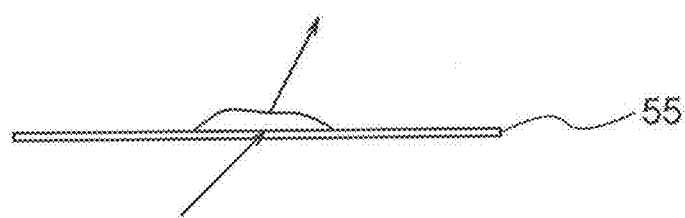
FIG. 7A is a diagram showing a state of refraction of light at a sample position.
Figure 7B:
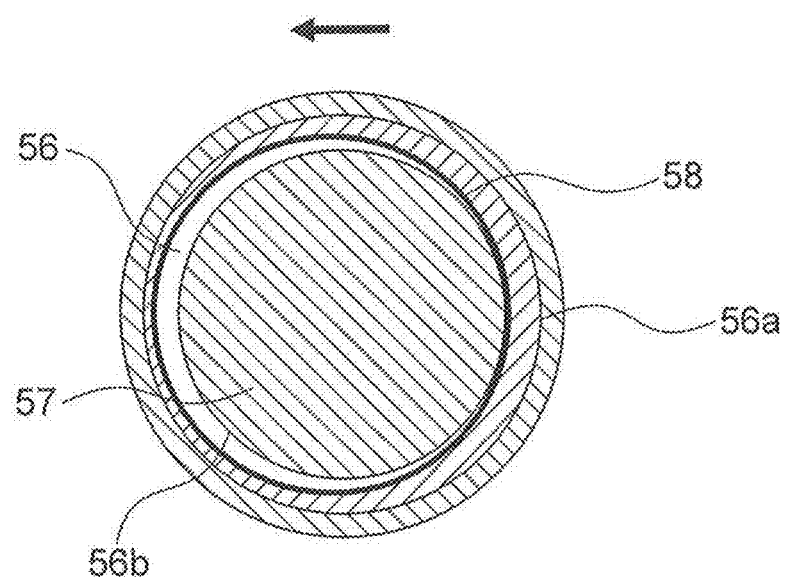
FIG. 7B is a diagram showing relationship between an image of the pupil of the illumination optical system and the aperture member.

FIG. 7A is a diagram showing the state of refraction of light at the sample position, and FIG. 7B is a diagram showing the relationship between an image of the pupil of the illumination optical system and the aperture member. FIG. 7A and FIG. 7B show a case where a sample is present. The case where a sample is present refers to a case where the surface of the sample is inclined (not-flat). Therefore, the case where a sample is present but its surface is flat, is not included in the case where a sample is present.

In the case where no sample is present, as shown in FIG. 6A, light incident on the holding member 55 and light emitted from the holding member 55 have same traveling direction. As a result, an image of the pupil of the objective lens formed at the pupil position of the pupil projection lens, i.e., at the position of the optical member 15 becomes as shown in FIG. 6B. The circle (circumference) indicated with numeral 58 is the outer edge image of the pupil of the objective lens, and the inside of the circle (circumference) is the image of the pupil of the objective lens.

As shown in FIG. 6B, a shape of the transmission part 56 is an annulus, a shape of the light-shielding part 57 is a circle, and a shape of the outer edge image 58 is a circle. Then, the transmission part 56, the light-shielding part 57 and the outer edge image 58 are concentric. Further, the center of the transmission part 56, the center of the light-shielding part 57 and the center of the outer edge image 58 coincide with each other.

Here, the center of the transmission part 56 refers to the center of a circle defining an outer edge 56a of the transmission part (since the transmission part 56 is an annulus, the center of the transmission part 56 is the center of the circle defining an inner edge 56b of the transmission part as well).

The outer edge image 58 is located outside (the direction moving away the optical axis) of the inner edge 56b of the transmission part, and is located inside (the direction approaching the optical axis) of the outer edge 56a of the transmission part. As just described, in the sample observation apparatus of the present embodiment, the image 58 of the outer edge of the pupil of the objective lens is formed between the inner edge 46b of the transmission part and the outer edge 56a of the transmission part.

Here, light outside of the outer edge image 58 does not pass through the transmission part 56 because it is not emitted from the objective lens 8. Therefore, the region of a light flux passing through the transmission part 56 is the region between the inner edge 56b of the transmission part and the outer edge image 58. Then, the area of this region as a whole corresponds to the brightness of the sample image.

On the other hand, in the case where a sample is present, as shown in FIG. 7A, light incident on the holding member 55 and light emitted from the holding member 55 have different traveling direction. As a result, an image of the pupil of the objective lens formed at the position of the optical member 15 becomes as shown in FIG. 7B. Also in FIG. 7B, the circle (circumference) indicated with numeral 58 is the outer edge image, and the inside of the circle (circumference) is the image of the pupil of the objective lens.

As shown in FIG. 7B, a shape of the transmission part 56 is an annulus, a shape of the light-shielding part 57 is a circle, and a shape of the outer edge image 58 is a circle. However, the transmission part 56 and the light-shielding part 57, and the outer edge image 58 are not concentric. Moreover, the center of the transmission part 56 and the center of the light-shielding part 57, and the center of the outer edge image 58 do not coincide with each other. That is, the center of the outer edge image 58 shifts to the left on the sheet with reference to the center of the transmission part 56 and the center of the light-shielding part 57.

In FIG. 7B as well, light outside of the outer edge image 58 does not pass through the transmission part 56 because it is not emitted from the objective lens 8. Therefore, the region of a light flux passing through the transmission part 56 is the region between the inner edge 56b of the transmission part and the outer edge image 58. Then, the area of this region as a whole corresponds to the brightness of the sample image.

Here, the outer edge image 58 is located outside of the inner edge 56b of the transmission part. In other words, in FIG. 7B, the light-shielding part 57 is located inside of the outer edge image 58. This is because the inclination of the surface of the sample is small. On the other hand, in the case where no sample is present as well, the light-shielding part 57 is located inside of the outer edge image 58. Therefore, even in the case where a sample is present, if the inclination of the surface of the sample is small, brightness of the sample image will be the same as in the case where no sample is present.

However, when the inclination of the sample surface is becomes larger, displacement of the center of the outer edge image 58 with reference to the center of the transmission part 56 becomes larger. In this case, apart of the outer edge image 58 will be located inside of the inner edge 56b of the transmission part. Moreover, a part of the outer edge image 58 will be located outside of the outer edge 56a of the transmission part. In other words, a part of the outer edge image 58 is located inside of the light-shielding part 57. As a result, the region of a light flux passing through the transmission part 56 changes greatly. That is, the brightness of the sample image is different from that in the case where no sample is present.

As described above, in the sample observation apparatus 1, the quantity of light passing through the optical member 15 increases in accordance with an amount of decentering of the image of the pupil of the illumination optical system.

As described above, in the sample observation apparatus of the present embodiment, a change in shape at the sample is converted into a change in displacement of the image of the pupil of the illumination optical system. Then, the change in displacement of the image of the pupil of the illumination optical system causes a change in the amount of a light flux passing through the transmission part provided with the detection optical system. That is, the change in shape at the sample can be detected as a change in brightness. As a result, even when the sample is colorless and transparent, it is possible to obtain a sample image with shadow.

In the sample observation apparatus of the present embodiment, it is preferable that the illumination optical system include an objective lens, the detection optical system include a pupil projection lens, and the following conditional expression (1) be satisfied:

$$(Rill \times \beta - R0)/(R1 - Rill \times \beta) < 1 \qquad (1)$$

where

R0 denotes a length from the optical axis of the detection optical system to the inner edge of the transmission part, R1 denotes a length from the optical axis of the detection optical system to the outer edge of the transmission part, Rill denotes a radius of the pupil of the illumination optical system, and $\beta$ denotes the value obtained by dividing a focal length of the pupil projection lens by a focal length of the objective lens.

By satisfying the conditional expression (1), it is possible to detect change in shape at the sample as change in brightness. As a result, even when the sample is colorless and transparent, it is possible to obtain a sample image with shadow.

When value of (Rill×β−R0) becomes too large, the conditional expression (1) is not satisfied. In this case, the size of the light-shielding part becomes too small. For this reason, the state in which brightness of the sample image does not change becomes long. In this case, it is difficult to detect fine change in shape at the sample as change in brightness.

In addition, when the value of (R1−Rill×β) becomes too small, the conditional expression (1) is not satisfied. In this case, distance from the outer edge of the transmission part to the outer edge image becomes too narrow. When the displacement of image of the pupil of the illumination optical system becomes large, the annular light-shielding part (such as the light-shielding part 50b' in FIG. 5B) is positioned inside of the outer edge image. For this reason, the light flux passing through the pupil of the objective lens decreases. As a result, the sample image becomes dark.

In the sample observation apparatus of the present embodiment, it is preferable that the illumination optical system include an objective lens, the detection optical system include a pupil projection lens, and the following conditional expressions (2) and (3) are satisfied:

$$0.7 \leq R0/(Rill \times \beta) < 1 \qquad (2)$$

$$1 < R1/(Rill \times \beta) \leq 2 \qquad (3)$$

where

R0 denotes a length from the optical axis of the detection optical system to the inner edge of the transmission part, R1 denotes a length from the optical axis of the detection optical system to the outer edge of the transmission part, Rill denotes a radius of the pupil of the illumination optical system, and $\beta$ denotes a value obtained by dividing the focal length of the pupil projection lens by the focal length of the objective lens.

In a case of falling below a lower limit value of the conditional expression (2), distance from the inner edge of the transmission part to the outer edge image becomes too wide. In this case, a difference in amount of the light flux passing through the pupil of the pupil projection lens does not become small between the case where the displacement of the image of the pupil of the illumination optical system is 0 and the case where the displacement is not 0. For this reason, it becomes difficult to detect change in shape at the sample as change in brightness. As a result, it becomes difficult to obtain a sample image with shadow, or contrast of the sample image deteriorates.

In a case of exceeding an upper limit value of the conditional expression (2), the transmission part is always located outside of the image of the pupil of the objective lens. For this reason, it is impossible to detect change in shape at the sample as change in brightness. Accordingly, the case of exceeding the upper limit value of the conditional expression (2) does not occur.

In a case of falling below a lower limit value of the conditional expression (3), the transmission part is located inside of the image of the pupil of the objective lens. For this reason, it becomes difficult to detect change in shape at the sample as change in brightness. Accordingly, the case of falling below the lower limit value of the conditional expression (3) does not occur.

By making so as not to exceed an upper limit value of the conditional expression (3), it is possible to reduce the light flux passing through a portion outside of the transmission part. Accordingly, it is possible to prevent occurrence of a flare and/or a ghost.

It is preferable that the following conditional expression (2') be satisfied instead of the conditional expression (2).

$$0.8 \leq R0/(Rill \times \beta) < 1 \qquad (2')$$

In addition, it is preferable that the following conditional expression (2") be satisfied instead of the conditional expression (2).

$$0.9 \leq R0/(Rill \times \beta) < 1 \qquad (2")$$

It is preferable that the following conditional expression (3') be satisfied instead of the conditional expression (3).

$$1 < R1/(Rill \times \beta) \leq 1.5 \qquad (3')$$

In addition, it is preferable that the following conditional expression (3") be satisfied instead of the conditional expression (3).

$$1 < R1/(Rill \times \beta) \leq 1.3 \qquad (3")$$

In the sample observation apparatus of the present embodiment, it is preferable that the following conditional expression (4) be satisfied:

$$Tin < Tout \qquad (4)$$

where

Tin denotes transmittance in the vicinity of the inner edge of the transmission part, and Tout denotes transmittance in the vicinity of the outside of the transmission part.

By satisfying the conditional expression (4), it is possible to reduce a state in which the amount I of the light flux does not change even when displacement of the image of the pupil of the illumination optical system changes. As a result, it is possible to detect finer change in shape at the sample as change in brightness.

The case where the optical member is disposed in the detection optical system has been described above. However, the optical member may be disposed in the illumination optical system. A case where the optical member is disposed in the illumination optical system will be described. The aperture member 50' shown in FIG. 5B is used as the optical member.

The aperture member 50' includes a light-shielding part 50'a1, a light-shielding part 50'a2, and a transmission part 50'b. The aperture member 50' is disposed such that the light-shielding part 50'a1 includes the optical axis of the detection optical system 4. The transmission part 50'b is located outside of the outer edge of the light-shielding part 50'a1.

Figure 8A:
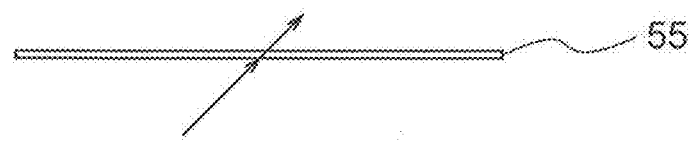
FIG. 8A is a diagram showing a state of refraction of light at a sample position.
Figure 8B:
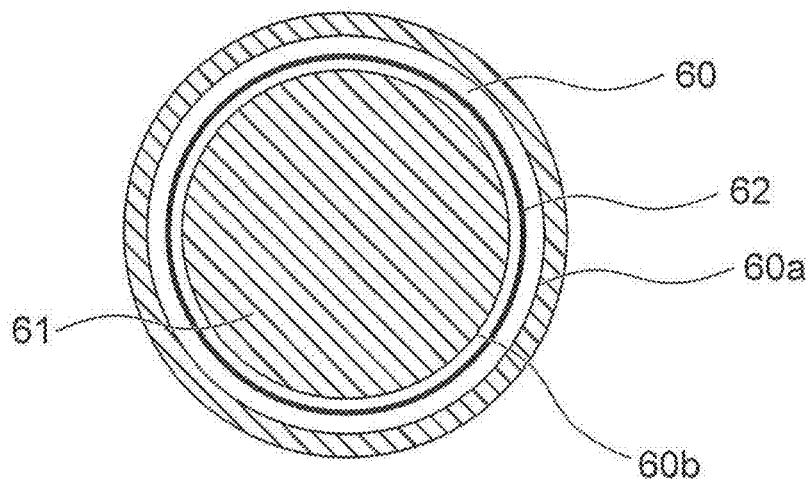
FIG. 8B is a diagram showing relationship between a pupil of a detection optical system and an image of the aperture member.
Figure 8C:
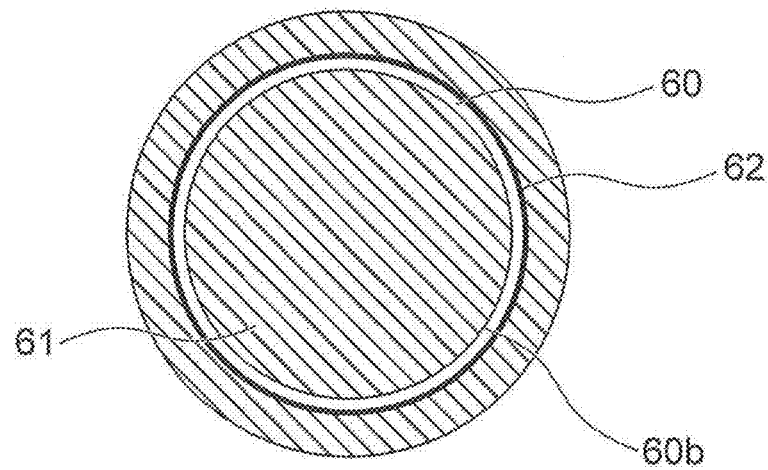
FIG. 8C is a diagram showing a state of a light flux passing through the pupil of the detection optical system.

FIG. 8A is a diagram showing the state of refraction of light at the sample position, FIG. 8B is a diagram showing the relationship between the pupil of the detection optical system and an image of the aperture member, and FIG. 8C is a diagram showing the state of a light flux passing through the pupil of the detection optical system. FIG. 8A, FIG. 8B and FIG. 8C show when no sample is present. The case where a sample is present but its surface is flat, is included in the case where no sample is present.

Figure 9A:
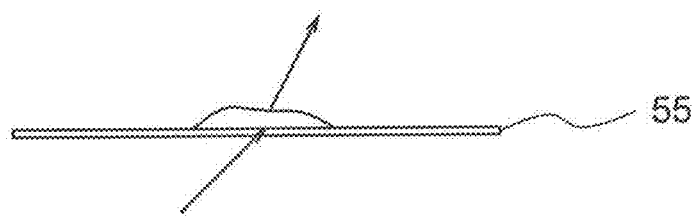
FIG. 9A is a diagram showing a state of refraction of light at a sample position.
Figure 9B:
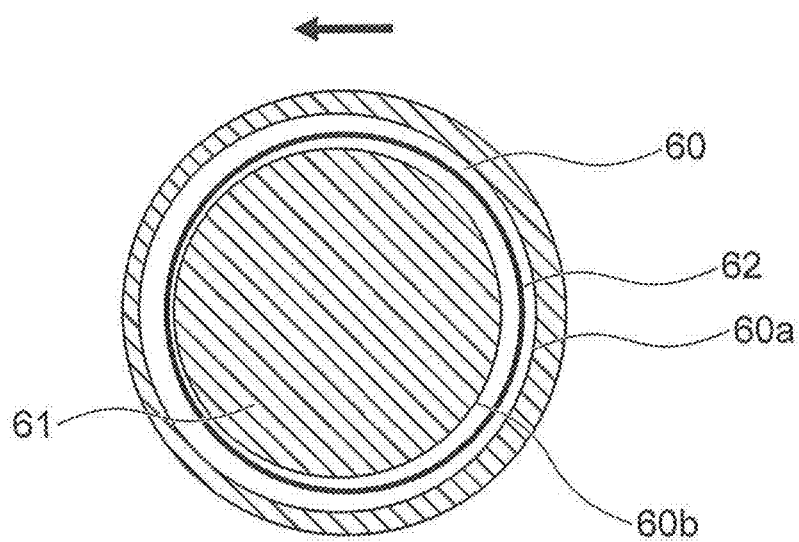
FIG. 9B is a diagram showing relationship between the pupil of the detection optical system and an image of the aperture member.
Figure 9C:
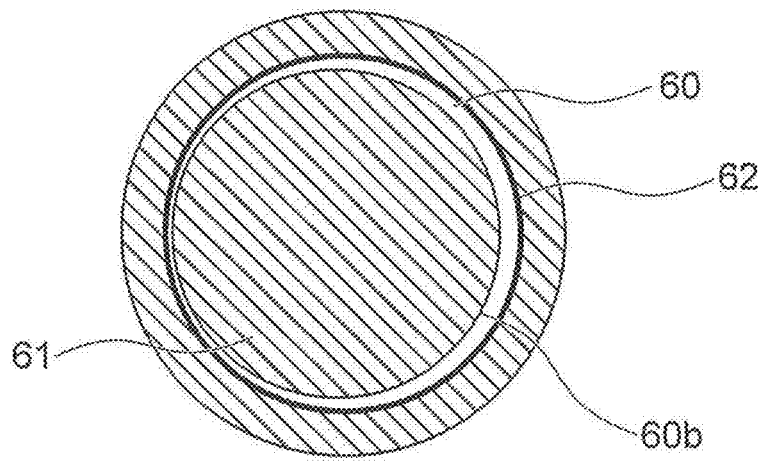
FIG. 9C is a diagram showing a state of a light flux passing through the pupil of the detection optical system.

FIG. 9A is a diagram showing the state of refraction of light at the sample position, FIG. 9B is a diagram showing the relationship between the pupil of the detection optical system and an image of the aperture member, and FIG. 9C is a diagram showing the state of a light flux passing through the pupil of the detection optical system. FIG. 9A, FIG. 9B and FIG. 9C show when a sample is present. The case where a sample is present refers to the case where the surface of the sample is inclined (not-flat). Therefore, the case where a sample is present but its surface is flat, is not included in the case where a sample is present.

In the case where no sample is present, as shown in FIG. 8A, light incident on the holding member 55 and light emitted from the holding member 55 have same traveling direction. As a result, an image of the aperture member formed at the pupil position of the pupil projection lens 14 becomes as shown in FIG. 8B. The circle (circumference) indicated with numeral 62 is the outer edge of the pupil of the pupil projection lens, and the inside of the circle (circumference) is the pupil of the pupil projection lens.

As shown in FIG. 8B, a shape of an image 60 of the transmission part is an annulus, a shape of an image 61 of the light-shielding part is a circle, and a shape of the outer edge 62 is a circle. Then, the image 60 of the transmission part, the image 61 of the light-shielding part, and the outer edge 62 are concentric. Moreover, a center of the image 60 of the transmission part, a center of the image 61 of the light-shielding part, and a center of the outer edge 62 coincide with each other. The image 61 of the light-shielding part is an image of the light-shielding part 50a1 in the aperture member 50 or an image of the light-shielding part 50' a1 in the aperture member 50', for example.

Here, the center of the image 60 of the transmission part refers to the center of a circle defining an image 60a of the outer edge of the transmission part (since the image 60 of the transmission part is annulus, the center of the image 60 of the transmission part is the center of the circle defining an image 60b of the inner edge of the transmission part as well).

Then, the image 60b of the inner edge of the transmission part is located inside (the direction approaching the optical axis) of the outer edge 62. Moreover, the image 60a of the outer edge of the transmission part is located outside (the direction moving away from the optical axis) of the outer edge 62. As just described, in the sample observation apparatus of the present embodiment, the image 60b of the inner edge of the transmission part is formed inside of the outer edge 62, and the image 60a of the outer edge of the transmission part is formed outside of the outer edge 62.

Here, light outside of the outer edge 62 does not pass through the pupil of the pupil projection lens (is not emitted from the pupil projection lens). Therefore, as shown in FIG. 8C, the region of a light flux passing through the pupil of the pupil projection lens is the region between the image 60b of the inner edge of the transmission part and the outer edge 62. Then, the area of this region as a whole corresponds to the brightness of the sample image.

On the other hand, in the case where a sample is present, as shown in FIG. 9A, light incident on the holding member 55 and the light emitted from the holding member 55 have different traveling direction. As a result, an image of the aperture member formed at the pupil position of the pupil projection lens becomes as shown in FIG. 9B. Also in FIG. 9B, the circle (circumference) indicated with numeral 62 is the outer edge of the pupil of the pupil projection lens, and the inside of the circle (circumference) is the pupil of the pupil projection lens.

As shown in FIG. 9B, a shape of an image 60 of the transmission part is an annulus, a shape of an image 61 of the light-shielding part is a circle, and a shape of the outer edge 62 is a circle. However, the image 60 of the transmission part and the image 61 of the light-shielding part, and the outer edge 62 are not concentric. Moreover, the center of the image 60 of the transmission part and the center of the image 61 of the light-shielding part, and the center of the outer edge 62 do not coincide with each other. That is, the center of the image 60 of the transmission part and the center of the image 61 of the light-shielding part shift to the left on the sheet with reference to the center of the outer edge 62.

Moreover, as shown in FIG. 9C, the region of a light flux passing through the pupil of the pupil projection lens is the region between the image 60b of the inner edge of the transmission part and the outer edge 62. Then, the area of this region as a whole corresponds to the brightness of the sample image.

Here, in FIG. 9B, the image 60b of the inner edge of the transmission part is located inside of the outer edge 62. In other words, in FIG. 9B, the image 61 of the light-shielding part is located inside of the outer edge 62. This is because the inclination of the surface of the sample is small. On the other hand, in the case where no sample is present as well, the image 61 of the light-shielding part is located inside of the outer edge 62. Therefore, even in the case where a sample is present, if the inclination of the surface of the sample is small, brightness of the sample image will be the same as in the case where no sample is present.

Figure 10A:
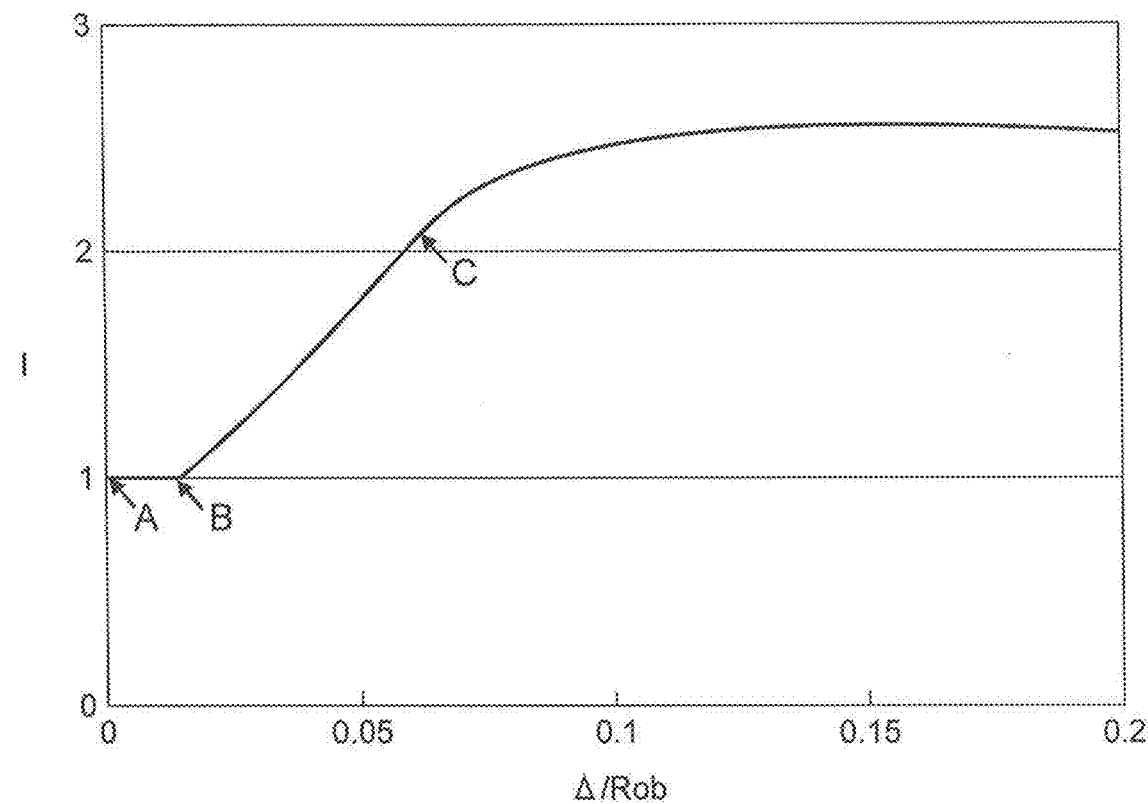
FIG. 10A is a graph showing relationship between an amount of displacement Δ and an amount I of light flux passing through a pupil of a pupil projection lens.
Figure 10B:
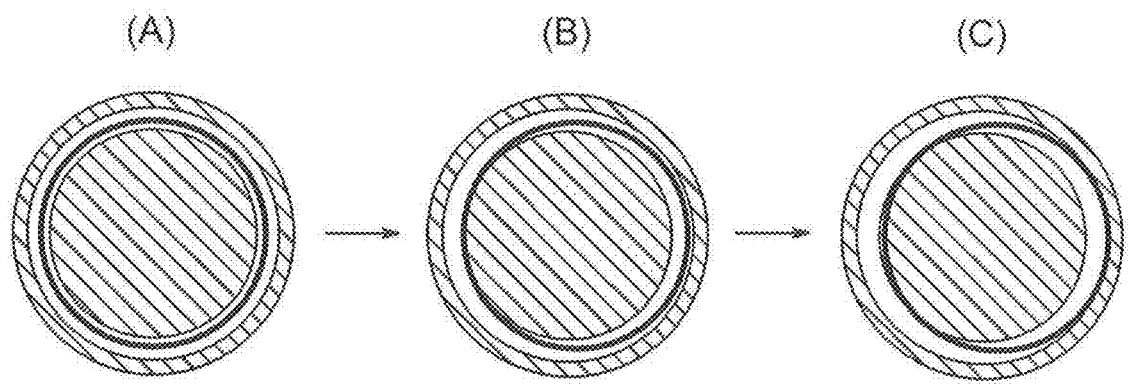
FIG. 10B is a diagram showing displacement of the image of the aperture member relative to a pupil of an objective lens.

However, when the inclination of the sample surface becomes larger, displacement of the center of the image 60 of the transmission part with reference to the center of the pupil of the pupil projection lens (hereinafter, referred to as "displacement of an image of the transmission part" as appropriate) becomes larger. In this case, as described later, a part of the image 60b of the inner edge of the transmission part will be located outside of the outer edge 62 (as shown in FIG. 10B). Moreover, a part of the image 60a of the outer edge of the transmission part will be located inside of the outer edge 62. In other words, a part of the image 61 of the light-shielding part is located outside of the outer edge 62. As a result, the region of a light flux passing through the pupil of the pupil projection lens changes greatly. That is, the brightness of the sample image is different from that in the case where no sample is present.

With this method, in the sample observation apparatus of the present embodiment, a change in shape at the sample (change in inclination) is converted into a change in displacement of the image of the transmission part. Then, the change in displacement of the image of the transmission part causes a change in the amount of a light flux passing through the pupil of the pupil projection lens. That is, the change in shape at the sample can be detected as a change in brightness. As a result, even when the sample is colorless and transparent, it is possible to obtain a sample image with shadow.

Further, in the sample observation device of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods (e.g., bright-field observation, fluorescent observation and polarization observation) can be performed easily with one objective lens.

When the optical member is disposed in the illumination optical system, the image of the optical member, that is, the image of the aperture member is displaced relative to the pupil of the pupil projection lens. Suppose that the amount of displacement Δ is an amount of displacement of the image of the aperture member relative to the pupil of the pupil projection lens, and the area S is an area of the light flux passing through the pupil of the pupil projection lens. When the amount of displacement Δ is changed, the area S is also changed. FIG. 10A is a graph showing relationship between the amount of displacement Δ and the area S. FIG. 10B is a diagram showing displacement of the image of the aperture member relative to the pupil of the objective lens.

In FIG. 10A, calculation is performed based on R'0×β=0.97×RPL, R'1×β=1.15×RPL.

where

R'0 denotes a length from the optical axis of the illumination optical system to the inner edge of the transmission part, R'1 denotes a length from the optical axis of the illumination optical system to the outer edge of the transmission part;

RPL denotes a radius of the pupil of the pupil projection lens; and

β denotes a value obtained by dividing the focal length of the pupil projection lens by the focal length of the objective lens.

Moreover, the transmittance of the transmission part is 100%. Moreover, in FIG. 10A, with respect to the numerical values on the horizontal axis, the displacement amount Δ is normalized with the radius RPL of the pupil of the pupil projection lens. The numerical values on the vertical axis are normalized with the area $(\pi(RPL^2-(R'0\times\beta)^2))$ when the displacement amount Δ is 0.

The area S indicates the area of a light flux passing through the pupil of the pupil projection lens. Therefore, the area S can be replaced with the amount I of the light flux. Then, in FIG. 10A, I is used as a variable of the vertical axis.

In the case where no sample is present (alternatively, the surface of the sample is flat), the displacement amount Δ is 0. In this case, the relationship between the pupil of the pupil projection lens and an image of the aperture member becomes as shown in (A) of FIG. 10B. Therefore, the amount I of the light flux becomes 1 as shown in arrow A.

Next, in the case where a sample is present, the displacement amount Δ is not 0. Here, when the inclination of the sample surface is small, the relationship between the pupil of the pupil projection lens and an image of the aperture member becomes as shown in (B) of FIG. 10B. However, although (A) in FIG. 10B and (B) in FIG. 10B differ in the position of the image of the light-shielding part in the pupil of the pupil projection lens, the image of the light-shielding part is located inside of the outer edge of the pupil of the pupil projection lens in both cases. Accordingly, the amount I of the light flux becomes 1 as shown in arrow B.

On the other hand, when the inclination of the sample surface is large, the relationship between the pupil of the pupil projection lens and an image of the aperture member becomes as shown in (C) of FIG. 10B. In this case, a part of the image of the light-shielding part is located outside of the pupil of the pupil projection lens. Therefore, the amount I of the light flux becomes more than 1 as shown in arrow C.

As just described, in the sample observation apparatus of the present embodiment, the amount I of a light flux changes with a change in the displacement amount Δ between arrow B and arrow C. Therefore, according to the sample observation apparatus of the present embodiment, it is possible to detect a change in shape at the sample as a change in brightness. As a result, even when the sample is colorless and transparent, it is possible to obtain a sample image with shadow.

Moreover, "the image of the inner edge of the transmission part is formed inside of the outer edge of the pupil of the pupil projection lens" includes not only the case where the entire image of the inner edge of the transmission part is included inside of the outer edge of the pupil of the pupil projection lens as shown in (B) of FIG. 10B, but also the case where a part of the image of the inner edge of the transmission part is included as shown in (C) of FIG. 10C.

In the sample observation apparatus of the embodiment, it is preferable that the optical element which changes alight flux diameter be disposed between the light source and the scanning unit.

Figure 11:
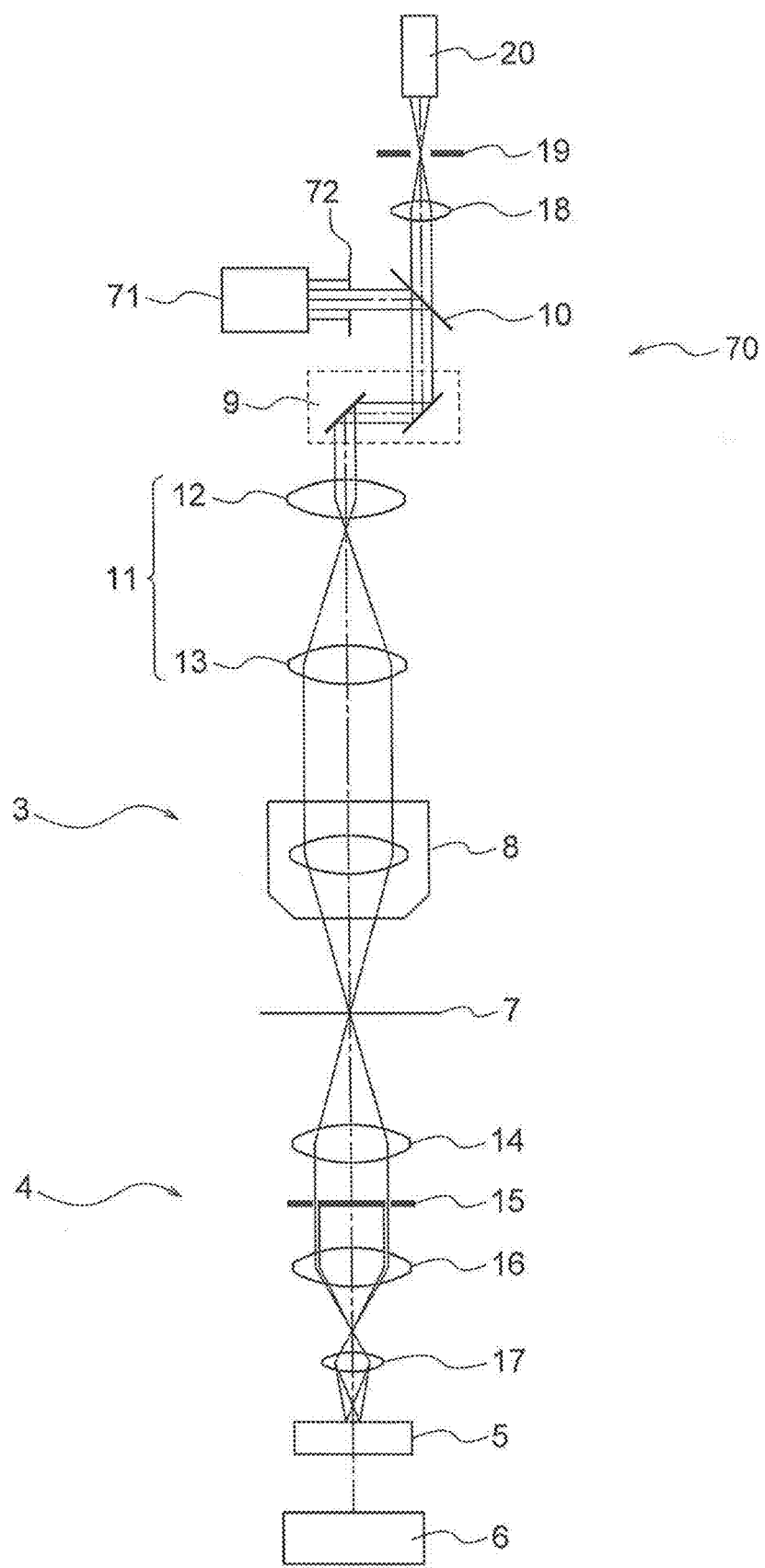
FIG. 11 is a diagram showing another sample observation apparatus of the present embodiment.

Another sample observation apparatus of the present embodiment will be described. FIG. 11 is a diagram showing another sample observation apparatus of the present embodiment. The same reference numerals are assigned to the same configurations as those in FIG. 1, and their detailed descriptions are omitted.

A sample observation apparatus 70 includes a light source unit 71 and a light flux diameter changing member 72. In the sample observation apparatus 70, the detection optical system 4 includes the optical member 15. The optical member 15 is an aperture member including a light-shielding part or a darkening part, and a transmission part.

In the sample observation apparatus 70, an image of an outer edge of the pupil of the illumination optical system is formed between the inner edge of the transmission part and the outer edge of the transmission part. Accordingly, it is possible to convert change in shape at the sample into change in displacement of the image of the pupil of the illumination optical system.

The illumination light passes through the pupil of the illumination optical system. In the following explanation, the outer edge of the pupil of the illumination optical system is replaced with an outer edge of the illumination light flux. To convert change in shape at the sample into change in displacement of the image of the pupil of the illumination optical system, an image of the outer edge of the illumination light flux may be formed between the inner edge of the transmission part and the outer edge of the transmission part.

In the sample observation apparatus 70, a microscope optical system is used. For this reason, a dry-type microscope objective lens or an immersion-type microscope objective lens is used as the objective lens 8. A state in which a dry-type microscope objective lens is used is referred to as first state, and a state in which an immersion-type microscope objective lens is used is referred to as second state.

In the first state, suppose that the image of the outer edge of the illumination light flux is formed between the inner edge of the transmission part and the outer edge of the transmission part. When the first state is changed to the second state, the objective lens 8 is changed from the dry-type microscope objective lens to the immersion-type microscope objective lens.

Generally, the numerical aperture of the immersion-type microscope objective lens is larger than the numerical aperture of the dry-type microscope objective lens. For this reason, when diameter of the illumination light flux emitted from the light source unit 71 is maintained at the light flux diameter in the first state, the image of the outer edge of the illumination light flux is not formed between the inner edge of the transmission part and the outer edge of the transmission part in the second state. As a result, in the second state, it is difficult to convert change in shape at the sample to change in displacement of the image of the pupil of the illumination optical system.

In the sample observation apparatus 70, it is possible to insert the light flux diameter changing member 72 into the optical path, in the optical path between the light source unit 71 and the light flux separation unit 10. The light flux diameter changing member 72 includes an aperture portion. The size of the aperture portion is set smaller than the diameter of the illumination light flux emitted from the light source unit 71 in the first state.

With change from the first state to the second state, the light flux diameter changing member 72 is inserted into the optical path. In this manner, it is possible to set the diameter of the illumination light flux emitted from the light source unit 71 smaller than the diameter of the illumination light flux in the first state. In this manner, also in the second state, the image of the outer edge of the illumination light flux is formed between the inner edge of the transmission part and the outer edge of the transmission part. As a result, also in the second state, it is possible to convert change in shape at the sample into change in displacement of the image of the pupil of the illumination optical system.

The explanation described above has been made for the case where the objective lens 8 is changed from the dry-type microscope objective lens to the immersion-type microscope objective lens, but the structure is not limited thereto. It suffices that the diameter of the illumination light flux emitted from the light source unit 71 is changed in accordance with change of the number of apertures of the illumination optical system. In addition, it suffices that the diameter of the illumination light flux emitted from the light source unit 71 is changed in accordance with change of the number of apertures of the detection optical system.

As described above, in the sample observation apparatus of the present embodiment, even when the numerical aperture of the illumination optical system and/or the numerical aperture of the detection optical system changes, change in shape at the sample is converted into change in displacement of the image of the pupil of the illumination optical system. Then, the change in displacement of the image of the pupil of the illumination optical system causes a change in the amount of a light flux passing through the pupil of the pupil projection lens. That is, the change in shape at the sample can be detected as a change in brightness. As a result, even when the sample is colorless and transparent, it is possible to obtain a sample image with shadow.

Figure 12A:
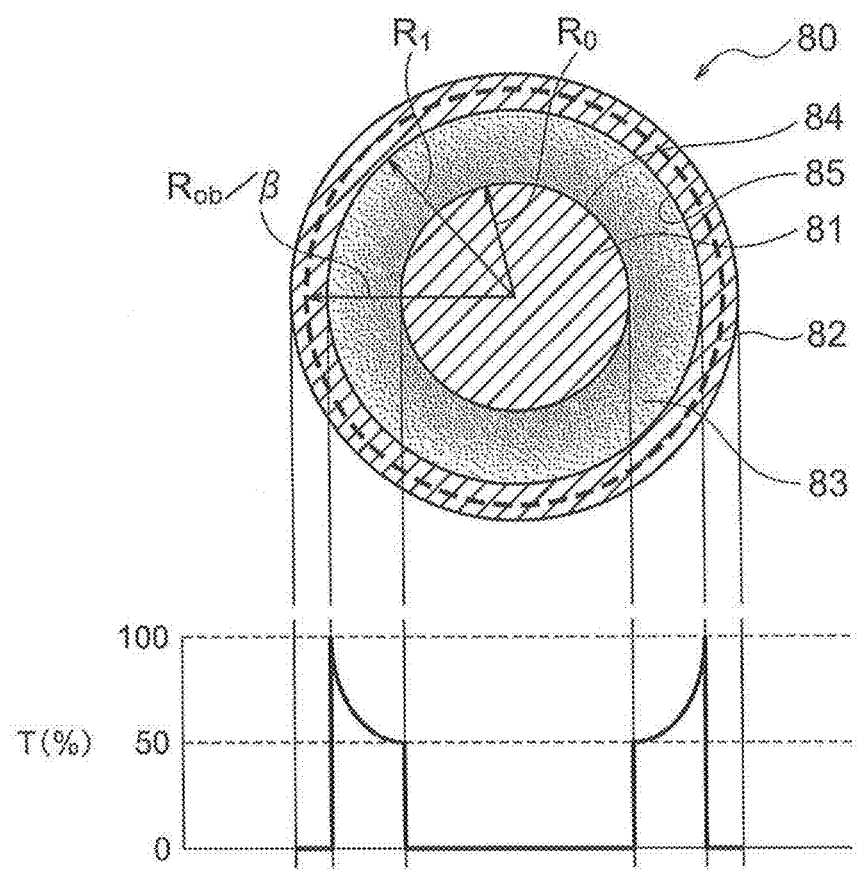
FIG. 12A is a diagram showing an aperture member in which transmittance of a transmission part continuously changes.
Figure 12B:
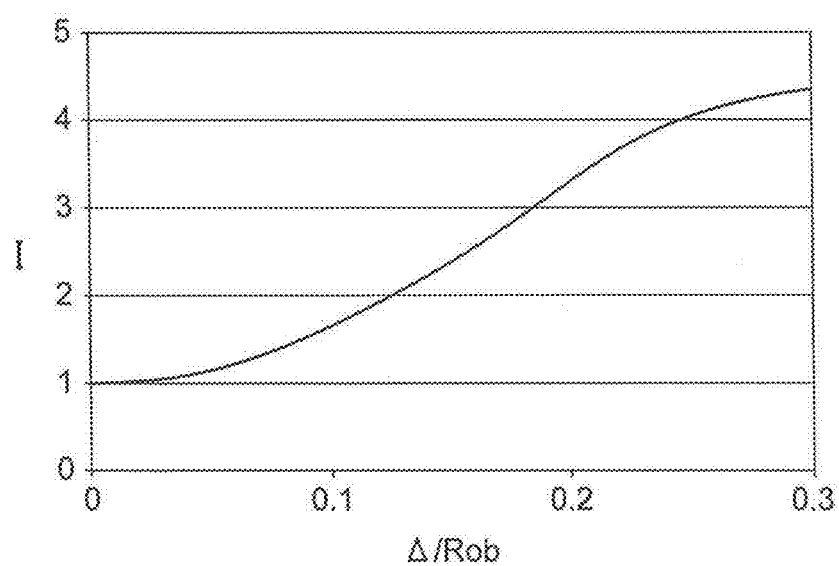
FIG. 12B is a graph showing relationship between the amount of displacement Δ and the amount I of the light flux passing through the pupil of the pupil projection lens.

A modification of the aperture member will be described. FIG. 12A is a diagram showing an aperture member in which transmittance of the transmission part continuously changes, and FIG. 12B is a graph showing relationship between the amount of displacement Δ and the amount I of the light flux passing through the pupil of the pupil projection lens.

As shown in FIG. 12A, an aperture member 80 includes a light-shielding part 81, a light-shielding part 82, and a transmission part 83. Each of the light-shielding parts 81 and 82 and the transmission part 83 is formed from a transparent member, such as a glass plate. The light-shielding parts 81 and 82 are formed by applying light-shielding paint on the glass plate, for example. As shown in FIG. 12B, both transmittance of the light-shielding part 81 and transmittance of the light-shielding part 82 are 0%.

In the transmission part 83, the transmittance continuously changes. For this reason, in the transmission part 83, for example, a reflection film (or absorption film) with continuously changing the transmittance is formed. A direction in which the transmittance changes is a direction going from the center toward the periphery (from the light-shielding part 81 side to the light-shielding part 82 side). In addition, the transmittance changes such that the transmittance gradually increases from the center toward the periphery.

The shape of the light-shielding part 81 is circular, and the shape of the light-shielding part 82 is annular. The shape of the transmission part 83 is an annular.

In the aperture member 80, a circumference 84 corresponds to the inner edge of the transmission part 83. In addition, a circumference 85 corresponds to the outer edge of the transmission part 83. In each of the circumference 84 and the circumference 85, the distance from each point on the circumference to the optical axis of the illumination optical system is the same. Accordingly, $R_0$ is the length from the optical axis of the illumination optical system to the circumference 84. $R_1$ is the length from the optical axis of the illumination optical system to the circumference 85.

The light-shielding part 82 is formed to include the outer edge of the image of the pupil of the objective lens. For this reason, the transmission part 83 is positioned inside of the outer edge of the image of the pupil of the objective lens. In this state, the transmission part 83 is formed to satisfy at least the conditional expression (1). Accordingly, even when the sample is colorless and transparent, it is possible to obtain a shaded image with high contrast. In addition, generated direction of shadow is not limited.

In addition, in the aperture member 80, the transmittance in the transmission part differs according to the position. The aperture member 80 is an aperture member satisfying the conditional expression (3). Therefore, according to the observation apparatus of present embodiment using such an aperture member, since a region having large transmittance moves to the outside of the image of the pupil of the objective lens with increase in the amount of displacement Δ, as shown in FIG. 12B, it is possible to make large the change in amount I of the light flux when the amount of displacement Δ changes. As a result, it is possible to detect inclination on the surface of the sample with high sensitivity. Specifically, it is possible to detect fine change in shape at the sample as change in brightness.

In the sample observation apparatus of the present embodiment, it is preferable that the transmission part be disposed asymmetrically relative to the optical axis of the illumination optical system.

Figure 13A:
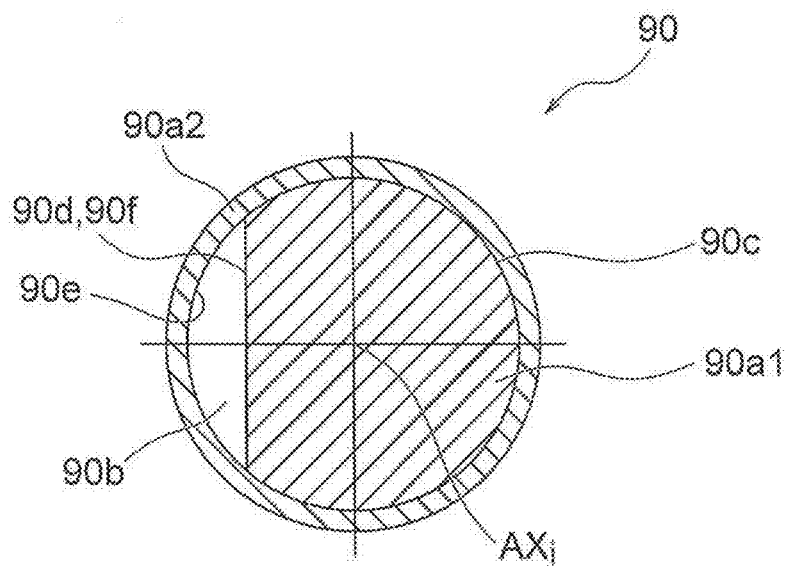
FIG. 13A is a diagram showing an aperture member in which a light-shielding part is formed outside of the transmission part.
Figure 13B:
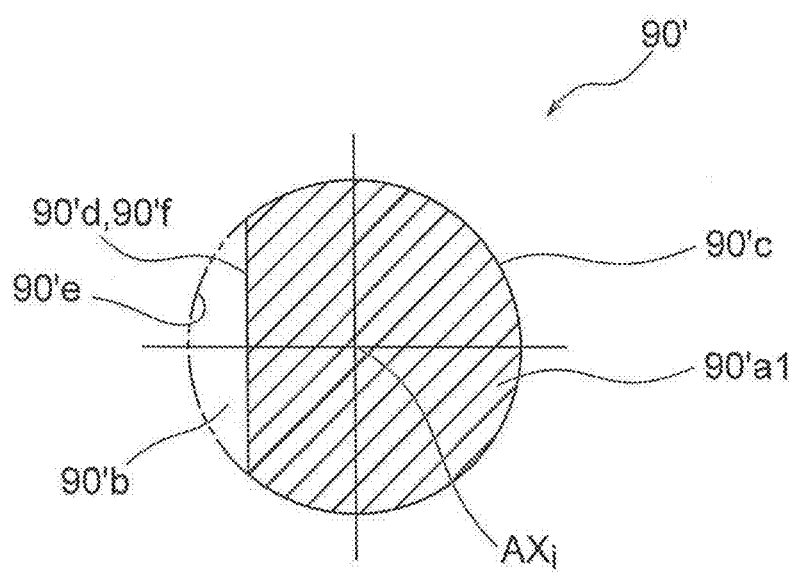
FIG. 13B is a diagram showing an aperture member in which no light-shielding part is formed outside of the transmission part.

The aperture member having such transmission part will be described. A configuration of the aperture member is shown in FIG. 13A and FIG. 13B. FIG. 13A is a diagram showings an aperture member in which a light-shielding part is formed outside of the transmission part. FIG. 13B is a diagram showing an aperture member in which no light-shielding part is formed outside of the transmission part. A darkening part may be used in place of the light-shielding part.

First, an aperture member 90 will be described. As shown in FIG. 13A, the aperture member 90 has a light-shielding part 90a1, a light-shielding part 90a2, and a transmission part 90b. FIG. 13A depicts the light-shielding part 90a1 and the light-shielding part 90a2 in a distinguishable manner, for convenience of explanation. However, both portions do not have to be distinguished from each other. The light-shielding part 90a1 and the light-shielding part 90a2 may be formed from a single member.

In the aperture member 90, the light-shielding part 90a1 and the light-shielding part 90a2 are formed from an opaque member, for example, a metal plate. In this case, the transmission part 90b is a gap (hole) formed in a metal plate. Alternatively, the light-shielding parts 90a1 and 90a2 and the transmission part 90b are formed from a transparent member, for example, a glass plate or a resin plate. In this case, the light-shielding part 90a1 and the light-shielding part 90a2 are formed, for example, by applying light-shielding paint on a glass plate, but the transmission part 90b is not coated. The transmission part 90b is thus a glass plate per se.

The light-shielding part 90a1 is formed so as to include the optical axis $AX_i$ of the illumination optical system. The shape of the light-shielding part 90a1 is defined by a first outer edge 90c and a second outer edge 90d. Both ends of the first outer edge 90c are connected to each other with the second outer edge 90d. In FIG. 13A, the first outer edge 90c is part of a circumference, and the second outer edge 90d is a straight line. As indicated by the first outer edge 90c and the second outer edge 90d, the light-shielding part 90a1 is shaped in the form of a circle with a cut-off segment, that is, a D-cut shape The shape of the transmission part 90b is defined by an outer edge 90e and an inner edge 90f. Both ends of the outer edge 90e are connected to each other with the inner edge 90f. In FIG. 13A, the outer edge 90e is part of a circumference, and the inner edge 90f is a straight line. As indicated by the outer edge 90e and the inner edge 90f, the transmission part 90b is shaped in the form of a circle with a cut-off segment, that is, a bow shape.

The shape of the light-shielding part 90a2 is a ring. Although the light-shielding part 90a2 is not necessarily provided, the provision of the light-shielding part 90a2 outside of the light-shielding part 90a1 makes clear the outer edge 90e. Thus, even when the diameter of light flux incident on the aperture member 90 is set larger than the outer edge 90e, the light flux incident on the aperture member 90 is restricted by the outer edge 90e when passing through the transmission part 90b.

Therefore, the maximum diameter of the light flux emitted from the aperture member 90 is thus a diameter determined by the outer edge 90e. Hence, when compared with an aperture member 90' described next, the diameter of light flux incident on the aperture member 90 need not be precisely matched with the outer edge 90e.

Next, the aperture member 90' will be described. As shown in FIG. 13B, the aperture member 90' has a light-shielding part 90'a1. In the aperture member 90', similar to the aperture member 90, the light-shielding part 90'a1 may be formed from an opaque member, for example, a metal plate. Alternatively, the light-shielding part 90'a1 may be formed from a transparent member, for example, a glass plate or a resin plate. The light-shielding part 90'a1 is formed, for example, by applying light-shielding paint on a glass plate.

The light-shielding part 90'a1 is formed so as to include the optical axis $AX_i$ of the illumination optical system. The shape of the light-shielding part 90'a1 is defined by a first outer edge 90'c and a second outer edge 90'd. Both ends of the first outer edge 90'c are connected to each other with the second outer edge 90'd. In FIG. 13B, the first outer edge 90'c is part of a circumference, and the second outer edge 90'd is a straight line. As indicated by the first outer edge 90'c and the second outer edge 90'd, the light-shielding part 90'a1 is shaped in the form of a circle with a cut-off segment, that is, a D-cut shape.

The shape of the transmission part 90'b is defined by an outer edge 90'e and an inner edge 90'f. Both ends of the outer edge 90'e are connected to each other with the inner edge 90'f. In FIG. 13B, the outer edge 90'e is part of a circumference, and the inner edge 90'f is a straight line. As indicated by the outer edge 90'e and the inner edge 90'f, the transmission part 90'b is shaped in the form of a circle with a cut-off segment, that is, a bow shape.

As described above, the shapes of the transmission part 90b and the transmission part 90'b are each a circle with a cut-off segment. Thus, it can be said that the transmission part 90b and the transmission part 90'b are both disposed asymmetrically with respect to the optical axis $AX_i$ of the illumination optical system.

When the aperture member 90' is formed from a metal plate, the transmission part 90'b does not physically exist. The outer edge of the transmission part 90'b therefore does not physically exist. When the aperture member 90' is formed from a transparent member, the transparent member is formed into the same shape as the light-shielding part 90'a1, so that the transmission part 90'b does not physically exist. The outer edge of the transmission part 90'b therefore does not physically exist.

In contrast, when the transparent member is formed into a circular shape, the transmission part 90'b physically exists. In this case, since the edge of the transparent member is the outer edge of the transmission part 90'b, the outer edge of the transmission part 90'b physically exists. However, since the transmission part 90'b is transparent, optically, substantially the same as when the aperture member 90' is formed from a metal plate. Therefore, even when the transparent member is formed into a circular shape, it is hard to say that the outer edge of the transmission part 90'b physically exists.

Accordingly, when the aperture member 90' is used, the diameter of light flux incident on the aperture member 90' is matched with the first outer edge 90'c. In this case, the outermost portion of the light flux comes to the outer edge of the transmission part 90'b. The inner edge of the transmission part 90'b is equivalent to the second outer edge 90'd. Based on the foregoing, the shape of the transmission part 90'b can be defined with the outermost portion of light flux and the second outer edge 90'd.

As described above, in the sample observation apparatus of the present embodiment, the optical member is disposed in at least one of the illumination optical system and the detection optical system. For this reason, the aperture member 90 and/or the aperture member 90' may be disposed in the detection optical system. In this case, the transmission part is disposed asymmetrically relative to the optical axis of the detection optical system.

An action generated with the aperture member 90 and/or the aperture member 90' will be described. Hereinafter, a case where the optical member is disposed in the detection optical system will be described. In the example of using the aperture member 50' described above, the state at the position of the pupil of the pupil projection lens has been explained. In the following explanation, a state at the position of the pupil of the objective lens will be described.

The relation between the pupil of the objective lens and the image of the aperture member will be described. In the following description, the aperture member 90 shown in FIG. 13A is used as an aperture member.

In the aperture member 90, the second outer edge 90d or the inner edge 90f is the boundary that separates the light-shielding part 90a1 from the transmission part 90b. Here, the axis vertical to this boundary is defined as a first axis, and the axis parallel to the boundary is defined as a second axis. In FIG. 13A, the first axis is the axis in the right-left direction in the drawing sheet, and the second axis is the axis in the top-bottom direction in the drawing sheet. In the following description, the first axis and the second axis are used for explanation.

Figure 14A:
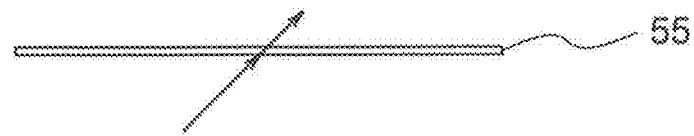
FIG. 14A is a diagram showing a state of refraction of light at a sample position.
Figure 14B:
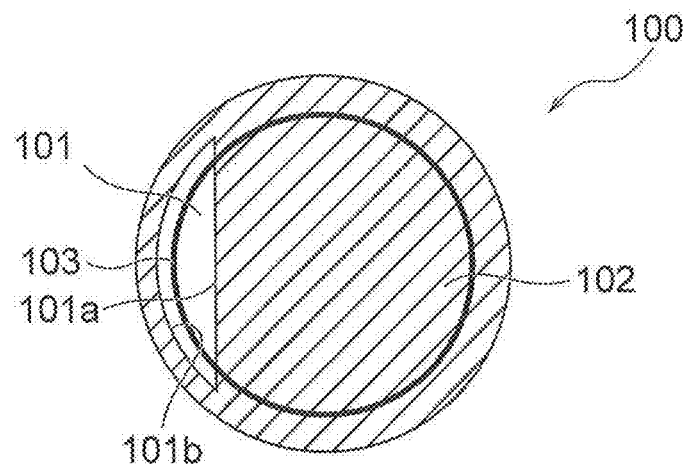
FIG. 14B is a diagram showing relationship between the pupil of the objective lens and an image of the aperture member.
Figure 14C:
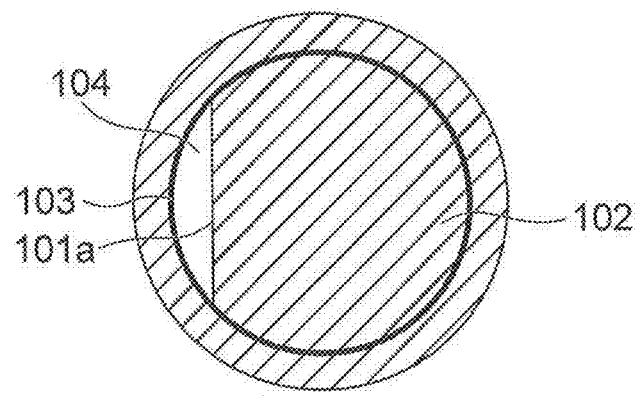
FIG. 14C is a diagram showing a state of a light flux passing through the pupil of the objective lens.

FIG. 14A is a diagram showing the state of refraction of light at the sample position, FIG. 14B is a diagram showing the relationship between the pupil of the objective lens and the image of the aperture member, and FIG. 14C is a diagram showing the state of a light flux passing through the pupil of the objective lens. In FIG. 14A, no sample is present. The case where a sample is present but its surface is flat, is included in the case where no sample is present.

Figure 15A:
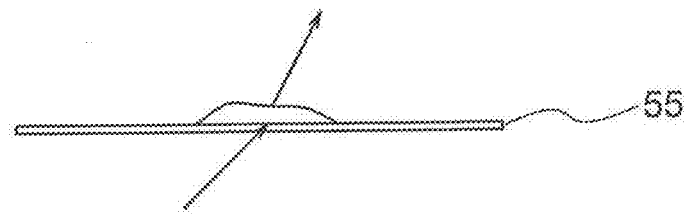
FIG. 15A is a diagram showing a state of refraction of light at a sample position.
Figure 15B:
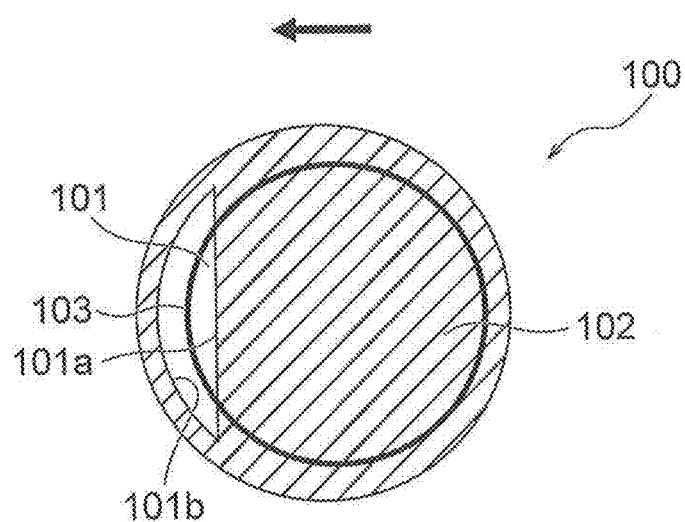
FIG. 15B is a diagram showing relationship between the pupil of the objective lens and an image of the aperture member.
Figure 15C:
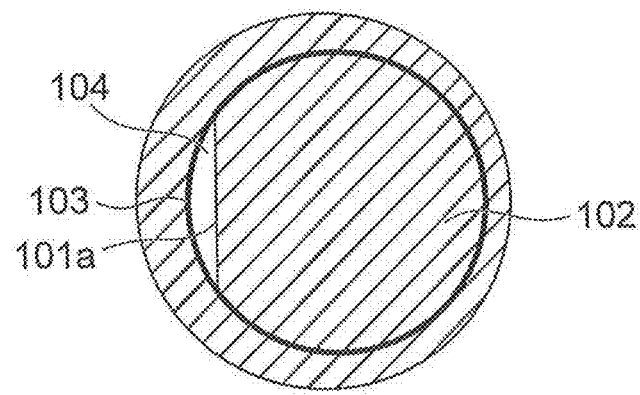
FIG. 15C is a diagram showing a state of a light flux passing through the pupil of the objective lens.

FIG. 15A is a diagram showing the state of refraction of light at the sample position, FIG. 15B is a diagram showing the relationship between the pupil of the objective lens and the image of the aperture member, and FIG. 15C is a diagram showing the state of a light flux passing through the pupil of the objective lens. In FIG. 15A, the inclination of the sample surface is downward to the right, that is, the sample surface is elevated from the left side to the right side of the first axis.

Figure 16A:
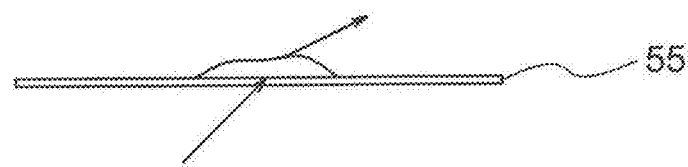
FIG. 16A is a diagram showing a state of refraction of light at a sample position.
Figure 16B:
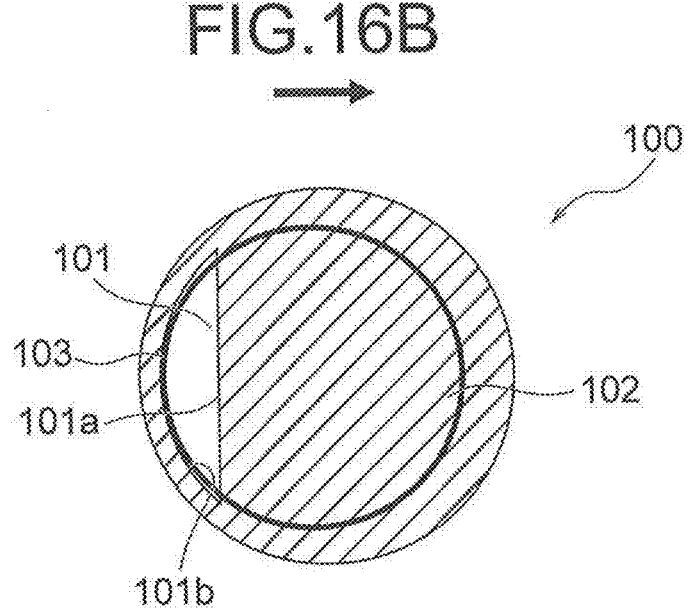
FIG. 16B is a diagram showing relationship between the pupil of the objective lens and an image of the aperture member.
Figure 16C:
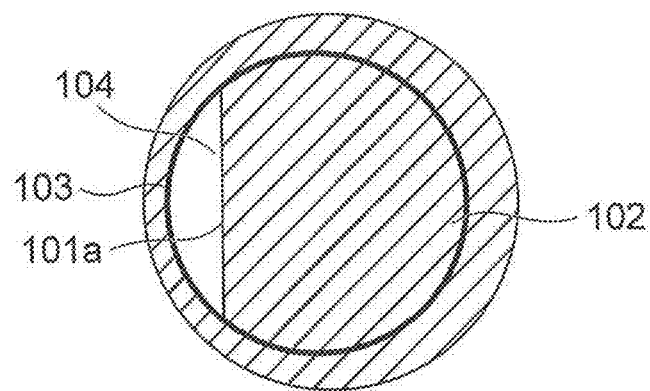
FIG. 16C is a diagram showing a state of a light flux passing through the pupil of the objective lens.

FIG. 16A is a diagram showing the state of refraction of light at the sample position, FIG. 16B is a diagram showing the relationship between the pupil of the objective lens and the image of the aperture member, and FIG. 16C is a diagram showing the state of a light flux passing through the pupil of the objective lens. In FIG. 16A, the inclination of the sample surface is upward to the right, that is, the sample surface is lowered from the left side to the right side of the first axis.

The case where a sample is present refers to a case where the surface of the sample is inclined (not-flat). Therefore, the case where a sample is present but its surface is flat, is not included in the case where a sample is present.

In the case where no sample is present, as shown in FIG. 14A, light incident on the holding member 55 and light emitted from the holding member 55 have same traveling direction. As a result, the image 100 of the aperture member formed at the pupil position of the objective lens becomes as shown in FIG. 14B. The circle (circumference) indicated with numeral 103 is the outer edge of the pupil of the objective lens, and the inside of the circle (circumference) is the pupil of the objective lens.

As shown in FIG. 14B, the image 101 of the transmission part is shaped like a bow, and the shape of the pupil 103 of the objective lens is a circle. Here, the image 101 of the transmission part is positioned so as to include part of the outer edge of the pupil 103 of the objective lens. On the other hand, the image 102 of the light-shielding part is positioned so as to cover the pupil 103 of the objective lens as a whole, except the region of the image 101 of the transmission part.

Then, the image 101a of the inner edge of the transmission part is positioned inside (the direction approaching the optical axis) of the outer edge of the pupil 103 of the objective lens. Moreover, the image 101b of the outer edge of the transmission part is positioned outside (the direction moving away the optical axis) of the outer edge of the pupil 103 of the objective lens. In this manner, in the sample observation apparatus of the present embodiment, the image 101a of the inner edge of the transmission part is formed inside of the outer edge of the pupil 103 of the objective lens, and the image 101b of the outer edge of the transmission part is formed outside of the outer edge of the pupil 103 of the objective lens.

Here, light outside of the outer edge of the pupil 103 of the objective lens does not pass through the pupil 103 of the objective lens (is not emitted from the objective lens 103). Therefore, as shown in FIG. 14C, the region 104 of the light flux passing through the pupil 103 of the objective lens is the region between the image 101a of the inner edge of the transmission part and the outer edge of the pupil 103 of the objective lens. Then, the area of this region 104 as a whole corresponds to the brightness of the sample image.

Both ends of the image 101a of the inner edge of the transmission part are positioned outside of the outer edge of the pupil 103 of the objective lens. Therefore, the image 101a of the inner edge of the transmission part is not entirely positioned inside of the outer edge of the pupil 103 of the objective lens. However, most of the image 101a of the inner edge of the transmission part is positioned inside of the outer edge of the pupil 103 of the objective lens. Accordingly, even in such a state, the image 101a of the inner edge of the transmission part is considered to be formed inside of the outer edge of the pupil 103 of the objective lens.

On the other hand, in the case where a sample is present, as shown in FIG. 15A and FIG. 16A, light incident on the holding member 55 and light emitted from the sample have different traveling directions.

In FIG. 15A, the sample surface is lowered from the left side to the right side of the first axis. Light emitted from the sample is deflected in the direction toward the optical axis. As a result, an image of the aperture member formed at the pupil position of the objective lens is as shown in FIG. 15B. Also in FIG. 15B, the circle (circumference) indicated with numeral 103 is the outer edge of the pupil of the objective lens, and the inside of the circle (circumference) is the pupil of the objective lens.

As shown in FIG. 15B, the image 101 of the transmission part is shaped like a bow, and the shape of the pupil 103 of the objective lens is a circle. Here, the image 101 of the transmission part is positioned so as to include part of the outer edge of the pupil 103 of the objective lens. On the other hand, the image 102 of the light-shielding part is positioned so as to cover the pupil of the objective lens as a whole, except the region of the image 101 of the transmission part.

The image 101a of the inner edge of the transmission part is positioned inside of the outer edge of the pupil 103 of the objective lens (the direction approaching the optical axis).

The image 101b of the outer edge of the transmission part is positioned outside of the outer edge of the pupil 103 of the objective lens (the direction moving away the optical axis).

However, when compared with the case where no sample is present, the image 100 of the aperture member is displaced leftward along the first axis with respect to the pupil 103 of the objective lens. Therefore, as shown in FIG. 15C, the distance from the image 101a of the inner edge of the transmission part to the outer edge of the pupil 103 of the objective lens is smaller than that in FIG. 14C. In this case, the area of the region 104 is smaller than the area of the region 104 in FIG. 14C. Therefore, the brightness of the sample image in FIG. 15C is lower than the brightness of the sample image in FIG. 14C.

Light emitted from the sample comes close to the optical axis as the inclination of the sample surface becomes steep. In this case, the brightness of the sample image becomes low. Conversely, light emitted from the sample goes away from the optical axis as the inclination of the sample surface becomes gentle. In this case, the brightness of the sample image becomes high.

In FIG. 16A, the sample surface is elevated from the left side to the right side of the first axis. Light emitted from the sample is deflected in the direction away from the optical axis. As a result, the image of the aperture member formed at the pupil position of the objective lens is as shown in FIG. 16B. Also in FIG. 16B, the circle (circumference) denoted by the reference sign 103 is the outer edge of the pupil of the objective lens, and the inside of the circle (circumference) is the pupil of the objective lens.

As shown in FIG. 16B, the image 101 of the transmission part is shaped like a bow, and the shape of the pupil 103 of the objective lens is a circle. Here, the image 101 of the transmission part is positioned so as to include part of the outer edge of the pupil 103 of the objective lens. On the other hand, the image 102 of the light-shielding part is positioned so as to cover the entire pupil of the objective lens, except the region of the image 101 of the transmission part.

The image 101a of the inner edge of the transmission part is positioned inside of the outer edge of the pupil 103 of the objective lens (the direction approaching the optical axis). The image 101b of the outer edge of the transmission part is positioned outside of the outer edge of the pupil 103 of the objective lens (the direction moving away the optical axis).

However, when compared with the case where no sample is present, the image 100 of the aperture member is displaced rightward along the first axis with respect to the pupil 103 of the objective lens. Therefore, as shown in FIG. 16C, the distance from the image 101a of the inner edge of the transmission part to the outer edge of the pupil 103 of the objective lens is larger than that in FIG. 14C. In this case, the area of the region 104 is larger than the area of the region 104 in FIG. 14C. Therefore, the brightness of the sample image in FIG. 16C is higher than the brightness of the sample image in FIG. 14C.

Light emitted from the sample goes away from the optical axis as the inclination of the sample surface becomes steep. In this case, the brightness of the sample image becomes high. Conversely, light emitted from the sample comes close to the optical axis as the inclination of the sample surface becomes gentle. In this case, the brightness of the sample image becomes low.

Figure 17A:
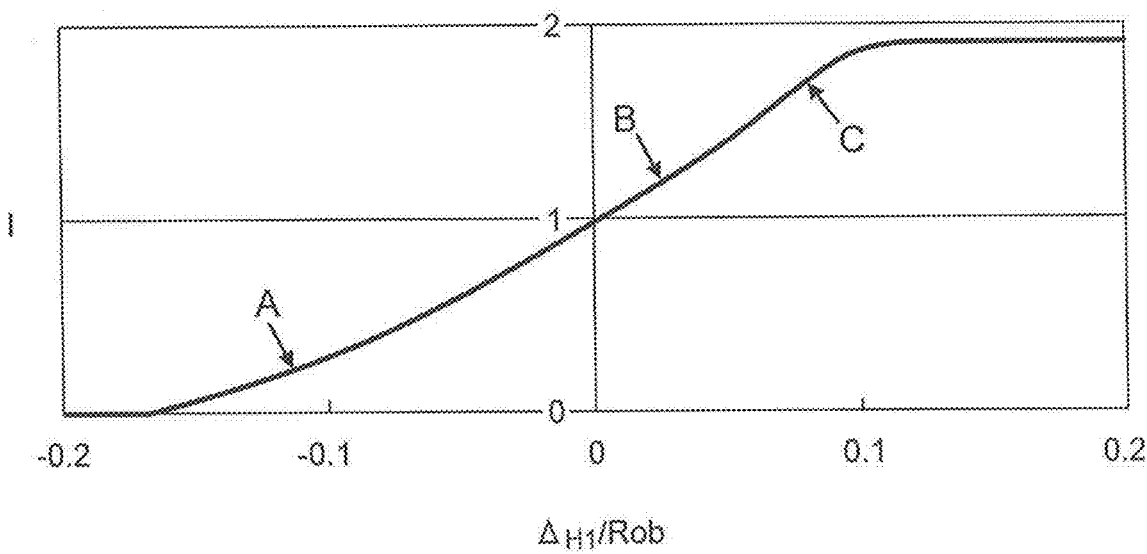
FIG. 17A is a graph showing relationship between an amount of displacement $\Delta_{H1}$ and an amount I of the light flux passing through the pupil of the pupil projection lens.
Figure 17B:
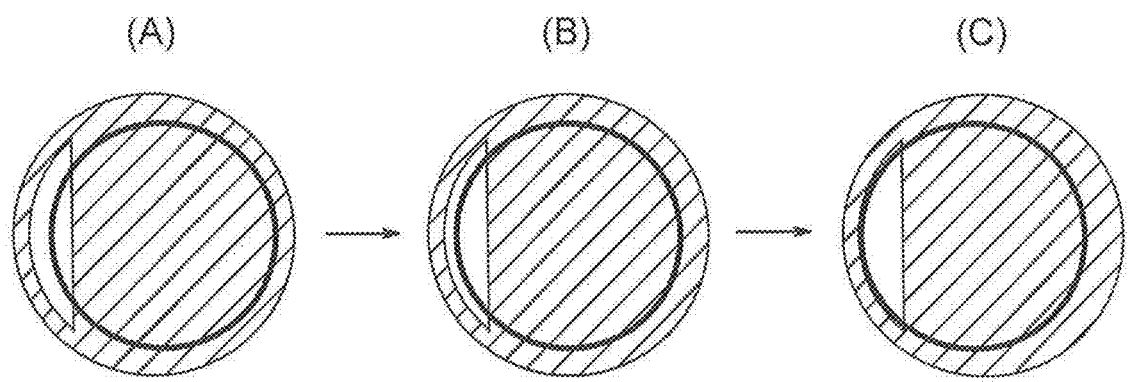
FIG. 17B is a diagram showing displacement of the image of the aperture member relative to the pupil of the objective lens.

FIG. 17A is a graph showing relationship between an amount of displacement $\Delta_{H1}$ and an amount I of the light flux passing through the pupil of the pupil projection lens. FIG. 17B is a diagram showing displacement of the image of the aperture member relative to the pupil of the objective lens. The amount of displacement $\Delta_{H1}$ is an amount of displacement of the image of the aperture member relative to the pupil of the objective lens, and is an amount of displacement in a direction along the first axis. The amount I of the light flux is an amount of the light flux passing through the pupil of the pupil projection lens.

In FIG. 17B, the image of the aperture member moves in the direction of the arrow in the order of (A), (B), and (C) with respect to the pupil of the objective lens. The direction in which the image of the aperture member is displaced is the direction along the first axis.

In FIG. 17A, the calculation is based on $L'_0 \times \beta = 0.8 \times RPL$ and $L'_1 \times \beta = 1.1 \times RPL$.

where $L'_0$ denotes a length from the optical axis of the illumination optical system to a predetermined position, $L'_1$ denotes a length from the optical axis of the illumination optical system to the outer edge of the transmission part, on the line connecting the optical axis of the illumination optical system with the predetermined position, the predetermined position is a position in which the length from the optical axis of the illumination optical system is made minimum, from among positions on the inner edge of the transmission part, RPL denotes the radius of the pupil of the pupil projection lens; and $\beta$ denotes the value obtained by dividing the focal length of the pupil projection lens by the focal length of the objective lens.

Moreover, the transmittance of the transmission part is set to 100%. In FIG. 17A, the numerical values on the horizontal axis are obtained by normalizing the displacement amount $\Delta_{H1}$ by the radius RPL of the pupil of the pupil projection lens. The numerical values on the vertical axis are normalized by the area when the displacement amount $\Delta_{H1}$ is zero:

$$S_0 = RPL^2 \times \theta - RPL \times L'_0 \times \beta \times \sin\theta$$

where $\theta = \cos^{-1}(L'_0 \times \beta / RPL)$.

The area S indicates the region of light flux passing through the pupil of the pupil projection lens. Thus, the area S can be replaced by the amount of light flux I. Then in FIG. 17A, I is used as a variable of the vertical axis.

When no sample is present (or when the sample surface is flat), the displacement amount $\Delta_{H1}$ is zero. In this case, the relation between the pupil of the objective lens and the image of the aperture member is as represented by (B) in FIG. 17B. Thus, the amount of light flux I is the amount denoted by the arrow B.

Next, when a sample is present, the displacement amount $\Delta_{H1}$ is not zero. Here, when the sample surface is elevated from the left side to the right side of the first axis, the relation between the pupil of the objective lens and the image of the aperture member is as represented by (A) in FIG. 17B. In this case, of the region of the image of the transmission part, the region positioned within the pupil of the objective lens is smaller than that of when the displacement amount $\Delta_{H1}$ is zero. Therefore, the amount of light flux I is the amount denoted by the arrow A.

In contrast, when the sample surface is lowered from the left side to the right side of the first axis, the relation between the pupil of the objective lens and the image of the aperture member is as represented by (C) in FIG. 17B. In this case, of the region of the image of the transmission part, the region positioned within the pupil of the objective lens is larger than that of when the displacement amount $\Delta_{H1}$ is zero. Therefore, the amount of light flux I is the amount denoted by the arrow C.

As just described, in the sample observation apparatus of the present embodiment, the amount of light flux I changes depending on a change of the displacement amount $\Delta_{H1}$. Thus, according to the sample observation apparatus of the present embodiment, a change in shape at the sample can be detected as a change in brightness. As a result, even when the sample is colorless and transparent, it is possible to obtain a sample image with shadow.

The case where the transmission part is disposed asymmetrically relative to the optical axis of the illumination optical system has been described. The action is acquired even when the transmission part is disposed asymmetrically relative to the optical axis of the detection optical system.

As described above, in the sample observation apparatus of the present embodiment, brightness of the sample image differs between the case where the sample is present and the case where no sample is present. In addition, the brightness of the sample image changes according to the direction of the inclination of the surface of the sample and/or the steepness of the inclination.

In this manner, in the sample observation apparatus of the present embodiment, a change in shape at the sample is converted into a change in displacement of the image of the transmission part. Then, the change in displacement of the image of the transmission part causes a change in the amount of a light flux passing through the pupil of the pupil projection lens. That is, the change in shape at the sample can be detected as a change in brightness. As a result, even when the sample is colorless and transparent, it is possible to obtain a sample image with shadow.

Further, in the sample observation apparatus of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods can be performed easily with one objective lens.

The direction in which shading occurs is determined according to the position of the image of the transmission part relative to the pupil of the objective lens. In the sample observation apparatus of the present embodiment, because it is possible to change the position of the image of the transmission part as desired, it is possible to change the generated direction of shadow as desired.

In the sample observation apparatus of the present embodiment, it is preferable that the transmission part be disposed asymmetrically relative to the optical axis of the detection optical system, and the following conditional expression (5) is satisfied:

$$L0 < Rill \times \beta < L1 \qquad (5)$$

where

L0 denotes a length from the optical axis of the detection optical system to a predetermined position, L1 denotes a length from the optical axis of the detection optical system to the outer edge of the transmission part, on a line connecting the optical axis of the detection optical system and the predetermined position, the predetermined position is a position in which a length from the optical axis of the illumination optical system is made minimum, from among positions on the inner edge of the transmission part, Rill denotes a radius of the pupil of the illumination optical system, and β denotes a value obtained by dividing the focal length of the pupil projection lens by the focal length of the objective lens.

Since the transmission part is disposed asymmetrically relative to the optical axis of the illumination optical system, shadow occurs in the sample image. For this reason, a sample image with solidity is acquired.

In the sample observation apparatus of the present embodiment, it is preferable that the transmission part be disposed asymmetrically relative to the optical axis of the detection optical system, and the following conditional expression (6) be satisfied:

$$0.2 < (Rill \times \beta - L0)/(L1 - Rill \times \beta) < 10 \qquad (6)$$

where

L0 denotes a length from the optical axis of the detection optical system to the predetermined position, L1 denotes a length from the optical axis of the detection optical system to the outer edge of the transmission part, on a line connecting the optical axis of the detection optical system and the predetermined position, the predetermined position is a position in which the length from the optical axis of the illumination optical system is made minimum, from among positions on the inner edge of the transmission part, Rill denotes a radius of the pupil of the illumination optical system, and β denotes a value obtained by dividing the focal length of the pupil projection lens by the focal length of the objective lens.

Since the transmission part is disposed asymmetrically relative to the optical axis of the illumination optical system, shadow occurs in the sample image. For this reason, a sample image with solidity is acquired.

By satisfying the conditional expression (6), an amount of change of the quantity of light in a case where the image of the aperture member is displaced in the direction along the first axis is substantially equal between a case where the image is displaced in the left direction and a case where the image is displaced in the right direction. Specifically, change in quantity of light in the case where the image is displaced in the left direction is symmetrical with change in quantity of light in the case where the image is displaced in the right direction.

In the sample observation apparatus of the present embodiment, it is preferable to include another aperture member different from the aperture member, and a moving mechanism for moving the aperture member and the other aperture member.

In this manner, it is possible to change the size and/or the position of the image of the transmission part. Specifically, by changing the aperture member to a different aperture member, it is possible to change the length from the optical axis to the inner edge of the transmission part and/or the length from the optical axis to the outer edge of the transmission part as desired. For this reason, it is possible to generate an illumination state in which shadow occurs in a best state according to the sample.

In addition, the following effect is generated in a case of using a phase contrast objective. When a ring slit for phase contrast observation is used as the illumination aperture, it is possible to perform phase contrast observation, and it is possible to perform observation with the sample observation apparatus of the present embodiment by using the aperture member shown in FIG. 5A and/or FIG. 5B. Specifically, it is possible to perform observation with the sample observation apparatus of the present embodiment and phase contrast observation, without changing the objective lenses. In addition, also in the observation methods such as differential interference observation and Hoffman modulation contrast observation, it is possible to perform observation with the sample observation apparatus of the present embodiment and these observations, without changing the objective lenses.

In the sample observation apparatus of the present embodiment, it is preferable that the illumination optical system include an optical member, the optical member is an aperture member including a light-shielding part or a darkening part, and a transmission part, the aperture member be disposed in a predetermined position such that the light-shielding part or the darkening part includes the optical axis of the illumination optical system, the predetermined position be a position between the light source unit and the scanning unit, or a pupil position of the illumination optical system, the transmission part is located outside of an outer edge of the light-shielding part or the darkening part, an image of an inner edge of the transmission part is formed inside of the outer edge of the pupil of the detection optical system, and an image of an outer edge of the transmission part is formed outside of the outer edge of the pupil of the detection optical system.

Figure 18:
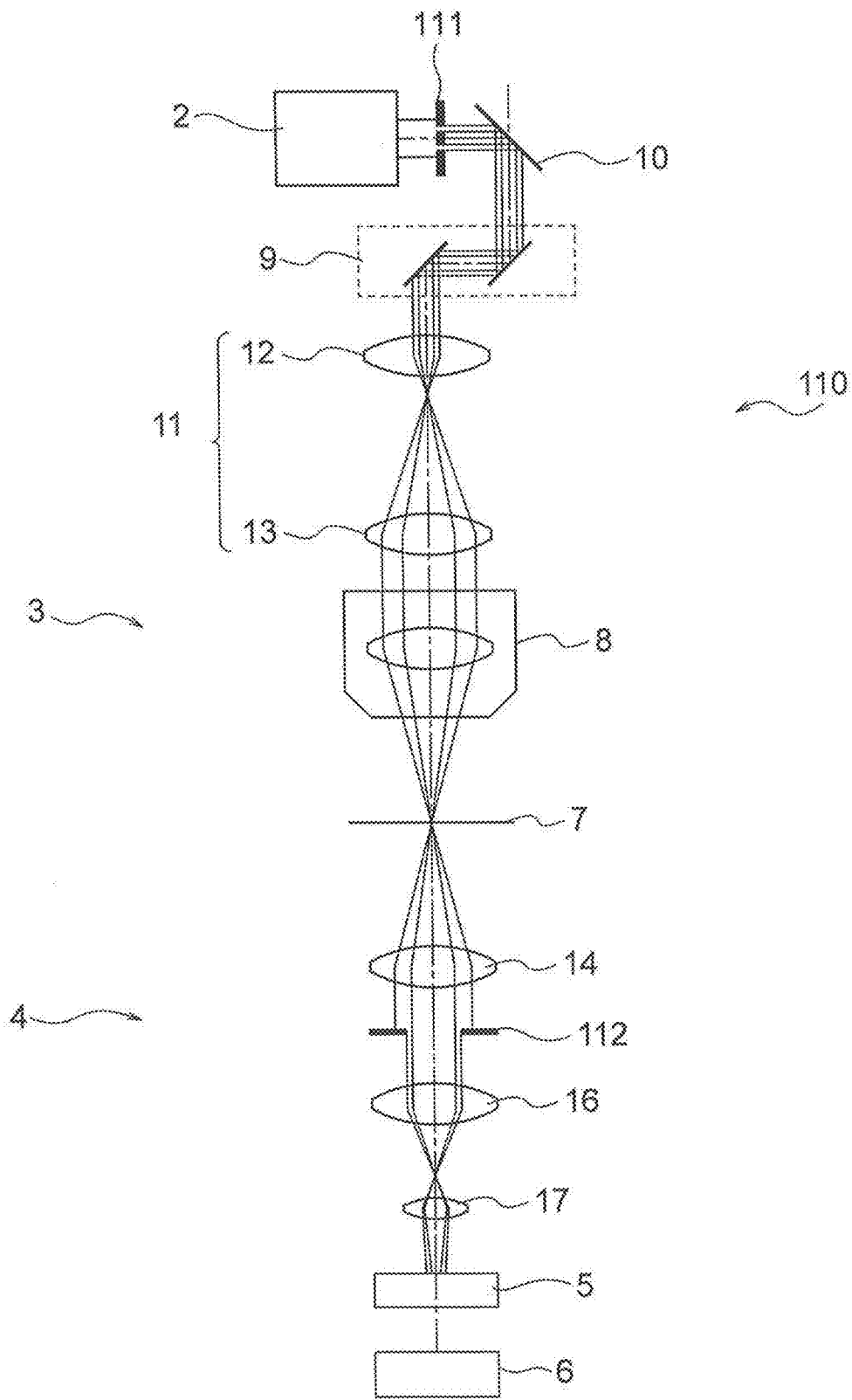
FIG. 18 is a diagram showing another sample observation apparatus of the present embodiment.

Another sample observation apparatus of the present embodiment will be described. FIG. 18 is a diagram showing another sample observation apparatus of the present embodiment. The same reference numerals are assigned to the same configurations as those in FIG. 1, and their detailed descriptions are omitted.

A sample observation apparatus 110 includes an optical member 111. The optical member 111 is an aperture member including a light-shielding part or a darkening part, and a transmission part. As the optical member 111, for example, it is possible to use the aperture member 50, the aperture member 50', the aperture member 90, or the aperture member 90'.

The optical member 111 is disposed at the predetermined position. The predetermined position is a position between the light source and the scanning unit, or the pupil position of the illumination optical system. In the sample observation apparatus 110, the optical member 111 is disposed between the light source unit 2 and the optical scanning unit 9.

The optical member 111 is disposed such that the light-shielding part or the darkening part includes the optical axis of the illumination optical system. For this reason, the illumination light emitted from the optical member 111 has an annular shape.

The position between the light source unit 2 and the optical scanning unit 9 is a position conjugate with the pupil position of the illumination optical system 3. Accordingly, it is possible to regard the optical member 111 as being disposed at the pupil position of the illumination optical system 3. In addition, the pupil position of the illumination optical system 3 is conjugate with the position of the pupil of the detection optical system 4. Accordingly, the image of the optical member 111 is formed at the pupil 112 of the detection optical system.

The case where the optical member is disposed in the illumination optical system has already been explained. Specifically, as shown in FIG. 17A, in the sample observation apparatus of the present embodiment, the amount I of the light flux changes according to change in amount of displacement Δ between the arrow B and the arrow C. For this reason, according to the sample observation apparatus of the present embodiment, the change in shape at the sample can be detected as a change in brightness. As a result, even when the sample is colorless and transparent, it is possible to obtain a sample image with shadow.

In the sample observation apparatus of the present embodiment, it is preferable that the light detection element be disposed at a position conjugate with the sample.

It is possible to miniaturize the light detection element.

Figure 19:
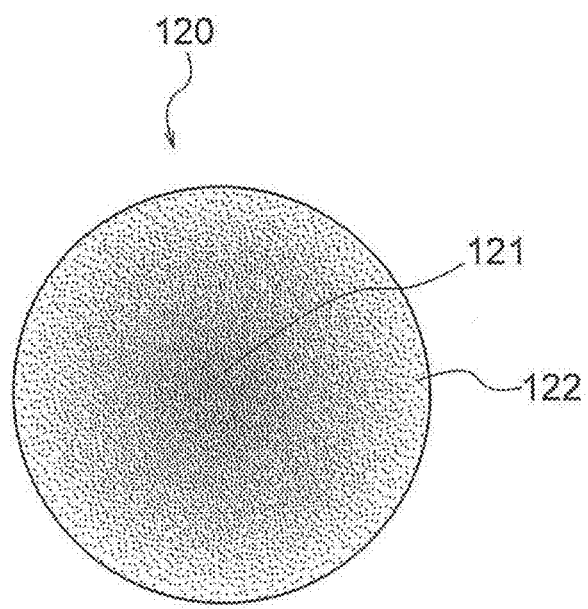
FIG. 19 is a diagram showing light intensity distribution of illumination light.

FIG. 19 is a diagram showing light intensity distribution of the illumination light. Illumination light 120 is illumination light with light intensity distributing non-uniformly. Just before the illumination light is incident on the aperture member, the illumination light 120 has a circular shape.

In the illumination light 120, the light intensity differs between center 121 of the light flux and periphery 122 of the light flux. The light intensity in the center 121 is smaller than the light intensity in the periphery 122. In addition, the light intensity increases from the center 121 toward the periphery 122. For this reason, it is possible to make large change in light flux passing through the pupil of the pupil projection lens due to inclination of the surface of the sample.

In another sample observation apparatus of the present embodiment, an aperture member is disposed both of the illumination optical system and the detection optical system. Here, in the illumination optical system, the illumination-side aperture member is disposed, and in the detection optical system, the detection-side aperture member is disposed. Then, the illumination-side aperture member and the detection-side aperture member each have a plurality of transmission parts.

Figure 20A:
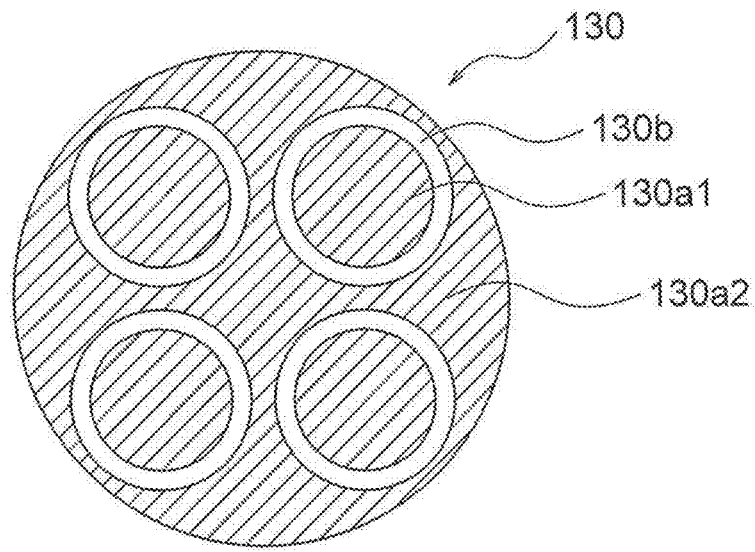
FIG. 20A is a diagram showing an illumination-side aperture member.
Figure 20B:
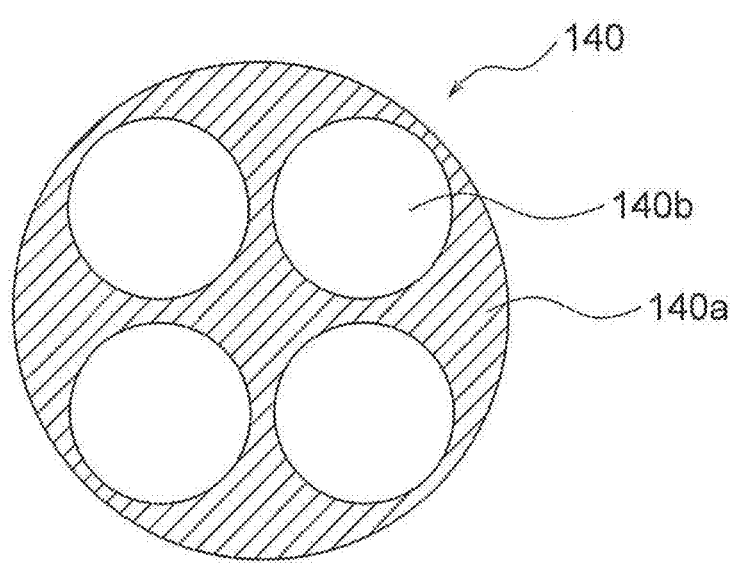
FIG. 20B is a diagram showing a detection-side aperture member.

FIG. 20A is a diagram showing the illumination-side aperture member and FIG. 20B is a diagram showing the detection-side aperture member. As shown in FIG. 20A, the illumination-side aperture member 130 includes a light-shielding part 130a1 and a transmission part 130b. Further, the aperture member 130 includes a light-shielding part 130a2.

The light-shielding parts 130a1, 130a2 and the transmission part 130b are formed from a transparent member, such as a glass plate or a resin plate. The light-shielding parts 130a1 and 130a2 are formed by applying light-shielding paint on a glass plate, for example. On the other hand, nothing is applied to the transmission part 130b. That is, the transmission part 130b is a glass plate as it is.

A shape of the light-shielding part 130a1 is a circle. Meanwhile, a shape of the transmission part 130b is band-shaped, specifically is an annulus.

In the illumination-side aperture member 130, a plurality of the light-shielding parts 130a1 are formed. Therefore, a plurality of the transmission parts 130b are also formed. Specifically, four transmission parts 130b are formed. Then, the four transmission parts 130b are disposed two-dimensionally. The illumination-side aperture member 130 is disposed at the position of the aperture member.

Meanwhile, as shown in FIG. 20B, the detection-side aperture member 140 includes a light-shielding part 140a and a transmission part 140b. The light-shielding part 140a and the transmission part 140b are formed from a transparent member, such as a glass plate or a resin plate.

The light-shielding parts 140a is formed by applying light-shielding paint on a glass plate, for example. On the other hand, nothing is applied to the transmission part 140b. That is, the transmission part 350b is a glass plate as it is.

An outer shape of the transmission part 140b and an outer shape of the transmission part 130b are similar. Specifically, since the outer shape of the transmission part 130b is a circle, the outer shape of the transmission part 140b also is a circle.

In the detection-side aperture member 140, a plurality of the transmission parts 140b are formed. Specifically, four transmission parts 140b are formed. Then, the four transmission parts 140b are disposed two-dimensionally. The detection-side aperture member 140 is disposed at the position of the pupil of the pupil projection lens.

Moreover, one transmission part 130b is paired with one transmission part 140b. Then, a pair of the transmission part 130b and the transmission part 140b is disposed so that their centers are made to be conjugate.

For instance, the right upper transmission part 130b of the illumination-side aperture member 130 is paired with the left lower transmission part 140b of the detection-side aperture member 140. Moreover, when an image of the right upper transmission part 130b is formed at the position of the left lower transmission part 140b, the center of the left lower transmission part 140b and the image of the right upper transmission part 130b coincide with each other.

Moreover, the image of the inner edge of the transmission part 130b is formed inside of the outer edge of the transmission part 140b, and the image of the outer edge of the transmission part 130b is formed outside of the outer edge of the transmission part 140b. Therefore, in the case of using the transmission part 130b and the transmission part 140b as a pair, the advantageous effects described above can be also obtained.

As a result, in the sample observation apparatus of the present embodiment, a change in shape at the sample is converted into a change in displacement of the image of the transmission part. Then, the change in displacement of the image of the transmission part causes a change in the amount of a light flux passing through the pupil of the pupil projection lens. That is, the change in shape at the sample can be detected as a change in brightness. As a result, even when the sample is colorless and transparent, it is possible to obtain a sample image with shadow.

Further, in the sample observation apparatus of the present embodiment, not only light passing through the periphery of the pupil of the objective lens but also light passing through the center of the pupil of the objective lens can contribute to imaging. Therefore, it is possible to obtain a brighter shadow image.

Figure 21:
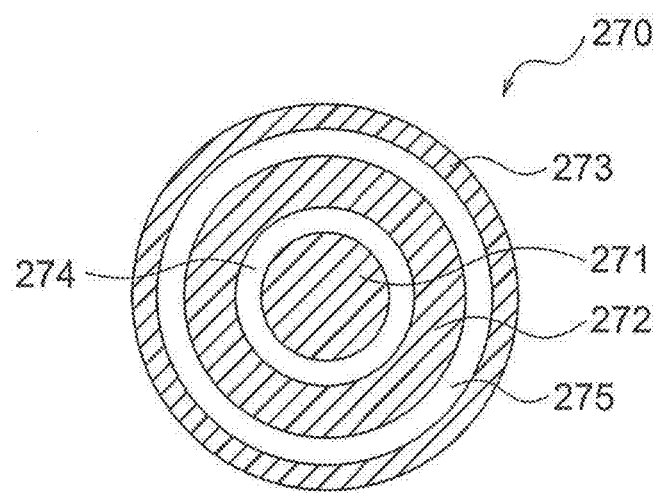
FIG. 21 is a diagram showing a structure of another aperture member.

FIG. 21 is a diagram showing the structure of another aperture member. An aperture member 270 includes a first light-shielding part 271, a second light-shielding part 272, a third light-shielding part 273, a first transmission part 274 and a second transmission part 275. The third light-shielding part 273 is not necessarily required.

The aperture member 270 may be disposed in the illumination optical system or the detection optical system. In this example, suppose that the aperture member 270 is disposed in the detection optical system.

The aperture member 270 is disposed such that the first light-shielding part 271 includes the optical axis of the detection optical system. The first transmission part 274 is located outside of the outer edge of the first light-shielding part 271, the second light-shielding part 272 is located outside of the outer edge of the first transmission part 274, and the second transmission part 275 is located outside of the outer edge of the second light-shielding part 272.

The first light-shielding part 271, the second light-shielding part 272, the third light-shielding part 273, the first transmission part 274 and the second transmission part 275 are formed from a transparent member, such as a glass plate or a resin plate. The first light-shielding part 271, the second light-shielding part 272 and the third light-shielding part 273 are formed by applying light-shielding paint on a glass plate, for example.

On the other hand, nothing is applied for the first transmission part 274 and the second transmission part 275. Accordingly, the first transmission part 274 and the second transmission part 275 are a glass plate as it is. The aperture member 270 corresponds to the aperture member 50' in FIG. 2B, which is provided with the first transmission part 274 at the light-shielding part 50'a1.

In the sample observation apparatus of the present embodiment, it is possible to use a plurality of objective lenses. For example, an objective lens with a large numerical aperture and an objective lens with a small numerical aperture are used for different observation purposes. In the objective lens with a large numerical aperture, light flux diameter of the illumination light becomes large as compared to the objective lens with a small numerical aperture.

Suppose that the number of transmission part in the aperture member is one, and the position and the width of the transmission part are provided for the objective lens with a large numerical aperture. With such an aperture member, when the objective lens with a large numerical aperture is changed to the objective lens with a small numerical aperture, there is the fear that the imaging light does not pass through the transmission part.

In the aperture member 270, two transmission parts, that is, the first transmission part 274 and the second transmission part 275 are provided. The first transmission part 274 is positioned inside of the second transmission part 275. For this reason, the first transmission part 274 serves as a transmission part for the objective lens with a small numerical aperture, and the second transmission part 275 serves as a transmission part for the objective lens with a large numerical aperture. In this manner, even though the number of aperture member is one, it is possible to acquire an image of a colorless and transparent sample with different objective lenses.

In the sample observation apparatus of the present embodiment, it is preferable that the optical member and a diffuser be disposed in the detection optical system, and the diffuser be disposed on a light detection element side beyond the optical member, and in the vicinity of the optical member.

In the objective lens with small magnification, the observation field becomes broader than the objective lens with large magnification. For this reason, imaging light from the periphery of the observation field is incident on the detection optical system at a large angle relative to the optical axis, and reaches the optical member. Even in the imaging light having passed through the transmission part of the optical member, angle of the light beam relative to the optical axis is large.

In the case where a lens is disposed between the optical member and the light detection element, when the angle of the light beam relative to the optical axis is large, the imaging light does not pass through the lens. In this case, it is impossible to detect the imaging light with the light detection element.

When the diffuser is disposed on the light detection element side beyond the optical member and in the vicinity of the optical member, the light beam is diffused with various angles by the diffuser. For this reason, it is possible to detect part of the imaging light having passed through the transmission part of the optical member by the light detection element. Accordingly, even in the case of using an objective lens with small magnification or in the case where the observation field is broad, it is possible to acquire an image of a colorless and transparent sample.

Figure 22A:
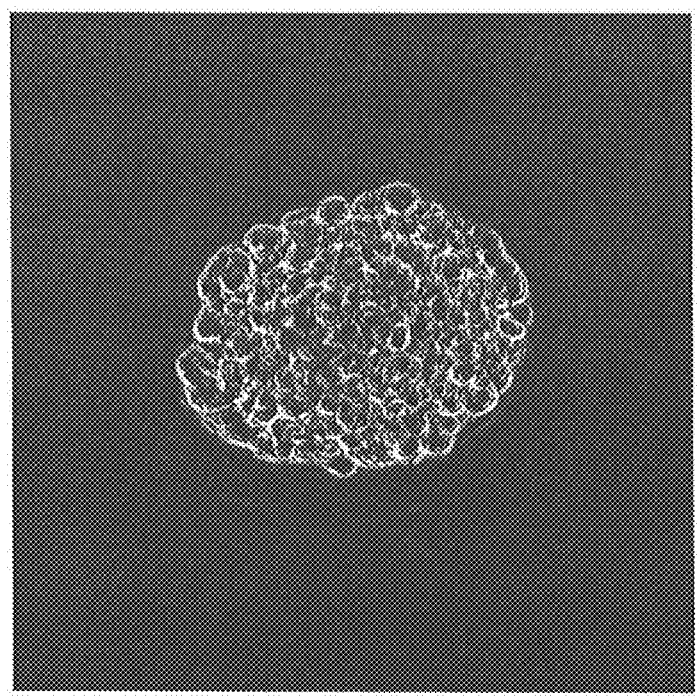
FIG. 22A is an image of a sample acquired with the sample observation apparatus of the present embodiment.
Figure 22B:
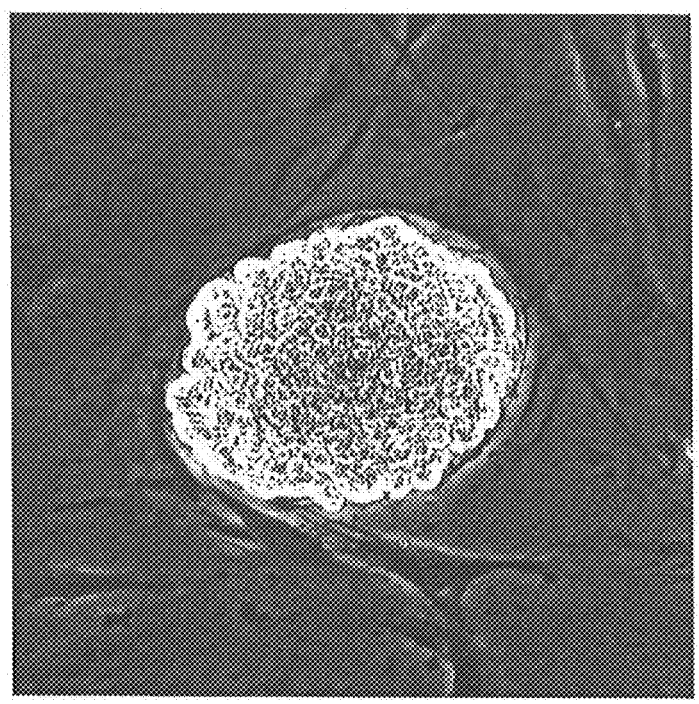
FIG. 22B is an image of a sample acquired by a phase contrast observation method.

An image of the sample acquired with the sample observation apparatus of the present embodiment is shown. FIG. 22A is an image of the sample acquired with the sample observation apparatus of the present embodiment. FIG. 22B is an image of the sample acquired by a phase contrast observation method.

Magnification of a used objective lens is 10 magnifications, and numerical aperture is 0.25. The wavelength of the laser light is 488 nm. The sample is an iPS cell.

As shown in FIG. 22A, in the sample observation apparatus of the present embodiment, few halos occur even when the sample is a thick cell. Accordingly, in an image in the sample observation apparatus of the present embodiment, a fine projecting and recessed structure on the surface of the colony is clearly seen.

By contrast, in the image in the phase contrast observation method, large halos occur as shown in FIG. 22B. For this reason, the structure on the surface of the colony is unclear.

According to the present embodiment, it is possible to provide a sample observation apparatus capable of acquiring an image of a colorless and transparent sample, without using the phase contrast observation method.

As described above, the present invention is suitable for a sample observation apparatus capable of acquiring an image of a colorless and transparent sample, without using the phase difference contrast method.

What is claimed is:

1. A sample observation apparatus comprising:
a light source;
an illumination optical system;
a detection optical system;
an image sensor; and
a processor comprising hardware, wherein
the illumination optical system and the detection optical system are disposed to face each other with a sample interposed therebetween,
light emitted from the light source is incident on the illumination optical system,
a light spot is formed between the illumination optical system and the detection optical system by the illumination optical system,
a scanning unit is disposed in an optical path from the light source to the image sensor,
the scanning unit relatively moves the light spot and the sample,
an aperture member is disposed in at least one of the illumination optical system and the detection optical system,
the illumination optical system and the detection optical system are disposed such that an image of a pupil of the illumination optical system is formed at a pupil position of the detection optical system,
the image of the pupil of the illumination optical system is decentered relative to a pupil of the detection optical system due to refraction caused by the sample,
the illumination optical system, the detection optical system, and the optical aperture member are configured such that a quantity of light passing through the pupil of the detection optical system changes by decentering,
the processor generates an image of the sample from a detection result of the image sensor, a first predetermined optical system is an optical system in which the aperture member is disposed,
a second predetermined optical system is an optical system in which the aperture member is not disposed,
the aperture member includes a transmission portion and one of a light-shielding portion or a darkening portion,
an inside region of a pupil region has a region which includes an optical axis of the first predetermined optical system and a region which does not include the optical axis of the first predetermined optical system,
the light-shielding portion or the darkening portion is disposed on the region which includes the optical axis of the first predetermined optical system,
the transmission portion includes a first region and a second region,
the first region is disposed on the region which does not include the optical axis of the first predetermined optical system, and
the second region is disposed on an outside region of the pupil region,
the inside region of the pupil region is a region located on the inside of an outer edge of an image of a pupil of the second predetermined optical system, which is formed on the aperture member when no sample is disposed, and
the outside region of the pupil region is a region located on the outside of the outer edge of the image of the pupil of the second predetermined optical system, which is formed on the aperture member when no sample is disposed, and is a region in which light flux emanated from the second predetermined optical system does not passes through when no sample is disposed.

2. The sample observation apparatus according to claim 1, wherein
the detection optical system includes the aperture member,
the aperture member is disposed such that the light-shielding portion or the darkening portion includes an optical axis of the detection optical system when no sample is disposed,
the transmission portion is located outside of an outer edge of the light-shielding portion or the darkening portion, and
an image of an outer edge of the pupil of the illumination optical system is formed between an inner edge of the transmission portion and an outer edge of the transmission portion when sample is disposed.

3. The sample observation apparatus according to claim 2, wherein
the illumination optical system includes an objective lens,
the detection optical system includes a pupil projection lens, and
following conditional expression (1) is satisfied:

$$(Rill \times \beta - R0)/(R1 - Rill \times \beta) < 1 \tag{1}$$

where
R0 denotes a length from the optical axis of the detection optical system to the inner edge of the transmission portion,
R1 denotes a length from the optical axis of the detection optical system to the outer edge of the transmission portion,
Rill denotes a radius of the pupil of the illumination optical system, and β denotes a value obtained by dividing a focal length of the pupil projection lens by a focal length of the objective lens.

4. The sample observation apparatus according to claim 2, wherein
the illumination optical system includes an objective lens,
the detection optical system includes a pupil projection lens, and
following conditional expressions (2) and (3) are satisfied:

$$0.7 \leq R0/(Rill \times \beta) < 1 \quad (2)$$

$$1 < R1/(Rill \times \beta) \leq 2 \quad (3)$$

where
R0 denotes a length from the optical axis of the detection optical system to the inner edge of the transmission portion,
R1 denotes a length from the optical axis of the detection optical system to the outer edge of the transmission portion,
Rill denotes a radius of the pupil of the illumination optical system, and
β denotes a value obtained by dividing a focal length of the pupil projection lens by a focal length of the objective lens.

5. The sample observation apparatus according to claim 2, wherein following conditional expression (4) is satisfied:

$$Tin < Tout \quad (4)$$

where
Tin denotes transmittance in a vicinity of the inner edge of the transmission portion, and
Tout denotes transmittance in a vicinity of outside of the transmission portion.

6. The sample observation apparatus according to claim 2, wherein
the transmission portion is disposed asymmetrically relative to the optical axis of the detection optical system, and
following conditional expression (5) is satisfied:

$$L0 < Rill \times \beta < L1 \quad (5)$$

where
L0 denotes a length from the optical axis of the detection optical system to a predetermined position,
L1 denotes a length from the optical axis of the detection optical system to the outer edge of the transmission portion, on a line connecting the optical axis of the detection optical system and the predetermined position,
the predetermined position is a position in which a length from the optical axis of the illumination optical system is made minimum, from among positions on the inner edge of the transmission portion,
Rill denotes a radius of the pupil of the illumination optical system, and
B denotes a value obtained by dividing a focal length of the pupil projection lens by a focal length of the objective lens.

7. The sample observation apparatus according to claim 2, wherein
the transmission portion is disposed asymmetrically relative to the optical axis of the detection optical system, and
following conditional expression (6) is satisfied:

$$0.2 < (Rill \times \beta - L0)/(L1 - Rill \times \beta) < 10 \quad (6)$$

where
L0 denotes a length from the optical axis of the detection optical system to a predetermined position,
L1 denotes a length from the optical axis of the detection optical system to the outer edge of the transmission portion, on a line connecting the optical axis of the detection optical system and the predetermined position,
the predetermined position is a position in which a length from the optical axis of the illumination optical system is made minimum, from among positions on the inner edge of the transmission portion,
Rill denotes a radius of the pupil of the illumination optical system, and
β denotes a value obtained by dividing a focal length of the pupil projection lens by a focal length of the objective lens.

8. The sample observation apparatus according to claim 1, further comprising:
another aperture member different from the aperture member; and
a moving mechanism moving the aperture member and the other aperture member.

9. The sample observation apparatus according to claim 1, wherein an optical element changing a light flux diameter is disposed between the light source and the scanning unit.

10. The sample observation apparatus according to claim 1, wherein
the illumination optical system includes the aperture member,
the aperture member is disposed in a predetermined position such that the light-shielding portion or the darkening portion includes an optical axis of the illumination optical system when no sample is disposed, the predetermined position being a position between the light source and the scanning unit, or being a pupil position of the illumination optical system,
the transmission portion is located outside of an outer edge of the light-shielding portion or the darkening portion when no sample is disposed,
an image of an inner edge of the transmission portion is formed inside of an outer edge of the pupil of the detection optical system when no sample is disposed, and
an image of an outer edge of the transmission portion is formed outside of the outer edge of the pupil of the detection optical system when no sample is disposed.

11. The sample observation apparatus according to claim 1, wherein the image sensor is disposed at a position conjugate with the sample.

12. The sample observation apparatus according to claim 1, further comprising:
a second image sensor to detect radiated light from the sample, wherein
detection of fluorescence is performed by the second image sensor.

13. The sample observation apparatus according to claim 1, wherein the first region and the second region are formed of one region without boundary.

14. A sample observation apparatus comprising:
a light source;
an illumination optical system;
a detection optical system;
an image sensor; and
a processor comprising hardware, wherein
the illumination optical system and the detection optical system are disposed to face each other with a sample interposed therebetween, light emitted from the light source is incident on the illumination optical system, a light spot is formed between the illumination optical system and the detection optical system by the illumination optical system, a scanning unit is disposed in an optical path from the light source to the image sensor, the scanning unit relatively moves the light spot and the sample, an optical member is disposed in at least one of the illumination optical system and the detection optical system, the illumination optical system and the detection optical system are disposed such that an image of a pupil of the illumination optical system is formed at a pupil position of the detection optical system, the image of the pupil of the illumination optical system is decentered relative to a pupil of the detection optical system due to refraction caused by the sample, the illumination optical system, the detection optical system, and the optical member are configured such that a quantity of light passing through the pupil of the detection optical system changes by decentering the image of the pupil of the illumination optical system, and the processor generates an image of the sample from a detection result of the image sensor.

* * * * *